US009852231B1

(12) United States Patent
Ravi et al.

(10) Patent No.: US 9,852,231 B1
(45) Date of Patent: Dec. 26, 2017

(54) SCALABLE GRAPH PROPAGATION FOR KNOWLEDGE EXPANSION

(71) Applicant: GOOGLE INC., Mountain View, CA (US)

(72) Inventors: Sujith Ravi, Santa Clara, CA (US); Qiming Diao, Mountain View, CA (US)

(73) Assignee: Google LLC, Mountain View, CA (US)

( * ) Notice: Subject to any disclaimer, the term of this patent is extended or adjusted under 35 U.S.C. 154(b) by 626 days.

(21) Appl. No.: 14/531,102

(22) Filed: Nov. 3, 2014

(51) Int. Cl.
    *G06F 17/00* (2006.01)
    *G06F 17/30* (2006.01)
    *G06N 99/00* (2010.01)

(52) U.S. Cl.
    CPC ..... *G06F 17/30958* (2013.01); *G06N 99/005* (2013.01)

(58) Field of Classification Search
    CPC ..... G06F 17/00; G06F 17/30; G06F 17/30958
    USPC .................................................. 707/600–899
    See application file for complete search history.

(56) References Cited

U.S. PATENT DOCUMENTS 8,745,647 B1 * 6/2014 Shin ..................... H04N 21/442
                                                725/10

OTHER PUBLICATIONS apache.org, "Welcome to Apache Giraph!", available online at <http://giraph.apache.org/>, 2013, 1 page.

Baluja et al., "Video Suggestion and Discovery for YouTube: Taking Random Walks Through the View Graph", International Conference on World Wide Web (WWW 2008), Apr. 21-25, 2008, 10 pages.
Belikn et al., "On Manifold Regularization", Proceeding of the Conference on Artificial Intelligence and Statistics, 2005, 8 pages.
Blitzer et al., "Semi-supervised Learning for Natural Language Processing", Tutorial Abstracts of ACL-08: HLT, Jun. 2008, 1 page.
Chapelle et al., "Semi-Supervised Learning", MIT Press, Cambridge, 2006, 524 pages.
Charikar, Moses S., "Similarity Estimation Techniques from Rounding Algorithms", STOC '02, May 19-21, 2002, 9 pages.
Corduneanu et al., "On Information Regularization", UAI 2003, pp. 151-158.

(Continued)

*Primary Examiner* — Isaac M Woo
(74) *Attorney, Agent, or Firm* — Brake Hughes Bellermann LLP

(57) ABSTRACT

Systems and methods for adding labels to a graph are disclosed. One system includes a plurality of computing devices including processors and memory storing an input graph generated based on a source data set, where an edge represents a similarity measure between two nodes in the input graph, the input graph being distributed across the plurality of computing devices, and some of the nodes are seed nodes associated with one or more training labels from a set of labels, each training label having an associated original weight. The memory may also store instructions that, when executed by the processors, cause the plurality of distributed computing devices to propagate the training labels through the input graph using a sparsity approximation for label propagation, resulting in learned weights for respective node and label pairs, and automatically update the source data set using node and label pairs selected based on the learned weights.

25 Claims, 10 Drawing Sheets

(56) References Cited

OTHER PUBLICATIONS

Cormode et al., "An Improved Data Stream Summary: The Count-Min Sketch and its Applications", Dec. 16, 2003, pp. 1-18.
Dean et al., "Large Scale Distributed Deep Networks", Proceedings of NIPS, 2012, 11 pages.
Durme et al., "Efficient Online Locality Sensitive Hashing via Reservoir Counting", 2013, 6 pages.
Goyal et al., "Streaming for large scale NLP: Language Modeling", Human Language Technologies: The 2009 Annual Conference of the North American Chapter of the Association for Computational Linguistics, NAACL '09, 2009, pp. 512-520.
Joachims, Thorsten, "Transductive Inference for Text Classification Using Support Vector Machines", Proceedings of the Sixteenth International Conference on Machine Learning, 1999, 10 pages.
Joachims, Thorsten, "Transductive Learning via Spectral Graph Partitioning", Proceedings of the Twentieth International Conference on Machine Learning (ICML-2003), 2003, 8 pages.
Kozareva et al., "Class Label Enhancement via Related Instances", Proceedings of the 2011 Conference on Empirical Methods in Natural Language Processing, Jul. 27-31, 2011, pp. 118-128.
Malewicz et al., "Pregel: A System for Large-Scale Graph Processing", SIGMOD '10, Jun. 6-11, 2010, pp. 135-145.
Manku et al. "Approximate Frequency Counts over Data Streams", 28th International Conference on Very Large Data Bases, VLDB '02, 2002, 12 pages.
Mikolov et al., "Distributed Representations of Words and Phrases and their Compositionality", Proceedings of NIPS, 2013, pp. 1-9.
Mikolov et al., "Efficient Estimation of Word Representations in Vector Space", Proceedings of Workshop at ICLR, Sep. 7, 2013, pp. 1-12.
Osborne et al., "Exponential Reservoir Sampling for Streaming Language Models", Proceedings of the 52nd Annual Meeting of the Association for Computational Linguistics (Short Papers), Jun. 23-25, 2014, pp. 687-692.
Riedel et al., "Relation Extraction with Matrix Factorization and Universal Schemas", Proceedings of the 2013 Conference of the North American Chapter of the Association for Computational Linguistics: Human Language Technologies, 2013, 11 pages.
Seeger, Matthias, "Learning With Labeled and Unlabeled Data", Dec. 19, 2002, pp. 1-62.
Subramanya et al., "Efficient Graph-Based Semi-Supervised Learning of Structured Tagging Models", Proceedings of the 2010 Conference on Empirical Methods in Natural Language Processing, Oct. 9-11, 2010, pp. 167-176.
Subramanya et al., "Entropic Graph Regularization in Non-Parametric Semi-Supervised Classification", Proceedings of NIPS, 2009, 9 pages.
Talukdar et al., "Experiments in Graph-based Semi-Supervised Learning Methods for Class-Instance Acquisition", Proceedings of the 48th Annual Meeting of the Association for Computational Linguistics, 2010, 9 pages.
Talukdar et al., "New Regularized Algorithms for Transductive Learning", Proceedings of the European Conference on Machine Learning and Knowledge Discovery in Databases: Part II, 2009, 16 pages.
Talukdar et al., "Scaling Graph-based Semi Supervised Learning to Large Number of Labels Using Count-Min Sketch", Proceedings of the 17th International Conference on Artificial Intelligence and Statistics (AISTATS), Feb. 26, 2014, 8 pages.
Talukdar et al., "Weakly-Supervised Acquisition of Labeled Class Instances using Graph Random Walks", Proceedings of the 2008 Conference on Empirical Methods in Natural Language Processing, Oct. 2008, pp. 582-590.
Ugander et al., "Balanced Label Propagation for Partitioning Massive Graphs", WSDM '13, Feb. 4-8, 2013, 11 pages.
Wang et al., "Label Propagation from ImageNet to 3D Point Clouds", Proceedings of CVPR, 2013, 8 pages.
Yao et al., "Universal Schema for Entity Type Prediction", Proceedings of the 2013 Workshop on Automated Knowledge Base Construction, 2013, 5 pages.
Zhu, Xiaojin, "Semi-Supervised Learning Literature Survey", Jul. 19, 2008, pp. 1-60.
Zhu et al., "Semi-Supervised Learning Using Gaussian Fields and Harmonic Functions", Proceedings of the Twentieth International Conference on Machine Learning (ICML-2003), 2003, 8 pages.

* cited by examiner

SCALABLE GRAPH PROPAGATION FOR KNOWLEDGE EXPANSION

BACKGROUND

Data sets reflect knowledge about entities. Some data sets are graph-based and may model knowledge, social, communication, and information networks. A graph G(V, E) consists of a set of nodes V, and a set of edges E where each edge connects two nodes in the graph. Each edge represents a particular piece of knowledge about the nodes it connects, for example membership in a group, a particular type of relationship, existence of an attribute, a similarity between nodes, etc. Other data sets can be normalized databases or object-oriented data stores that store attributes or properties for an entity. As a particular data set grows, reflecting additional knowledge, the data set may become too large to fit on one machine. But even very large data sets are often incomplete. For example, a graph-based data set may include nodes with no edges or only a few edges. However, it can be a challenge to identify and add the additional knowledge to a large data set due to the size of the data set, which causes conventional knowledge propagation methods to run out of memory or run too long.

SUMMARY

Implementations provide scalable systems and methods for expanding knowledge in a large graph-based data store. The methods may use an input graph of nodes connected by edges, where the weight of an edge represents a similarity measure between the nodes. The input graph includes seed nodes that have labels. The labels can represent relationships or attributes captured in a source data set. As one example, the nodes in the input graph can represent entities and the labels can represent properties or attributes of the entity. As another example, the nodes in the input graph can represent two nodes from a source graph and the label can represent a relationship between the two nodes. The similarity measure, represented by a weight of an edge in the input graph, may be based on information in the source data set. The system propagates the labels of the seed nodes through the graph, generating likely labels for an unlabeled node based on similarity with and distance from seed nodes. After propagating the labels, the system can automatically update the source data set using the likely labels. The method uses a novel semi-supervised learning method to learn the likely labels. The semi-supervised learning method includes a streaming sparsity approximation to reduce the time and complexity of the propagation, making implementations scalable to very large graphs. In some implementations, the system may augment the input graph prior to propagating the existing labels, which increases the quality and quantity of the learned labels. In some implementations, the system may factor in weights for learned labels that account information from more reliable neighbors more heavily.

According to certain aspects of the disclosure, a method includes initializing, for nodes in a distributed graph comprising labeled nodes and unlabeled nodes, wherein an edge between two nodes in the distributed graph represents a similarity measure between the two nodes, learned label weights for at least a non-zero quantity k of labels per node. The method also includes, for a first node in the distributed graph, sending the learned label weights for the node to each neighbor in the distributed graph, receiving a set of at least k learned label weights from each neighbor, determining top-ranked labels for the first node based on a probability-based sparsity approximation using the received sets of learned label weights, and calculating learned label weights for top-ranked labels of the first node based on an aggregation of the received sets of learned label weights from the neighbors. The method also includes repeating the sending, receiving, determining, and calculating for a quantity of iterations, determining, from the learned label weights for the first node, a first label with a weight that meets or exceeds a threshold, and automatically updating a source data set with the first label, responsive to the determining.

According to an aspect of the disclosure, a system includes a plurality of computing devices including processors formed in a substrate and memory storing: an input graph of nodes connected by edges, an edge representing a similarity measure between two nodes, the graph being distributed across the plurality of computing devices, wherein at least some of the nodes are seed nodes associated with one or more training labels from a set of labels, each training label having an associated original weight, the input graph being generated based on a source data set. The memory may also store instructions that, when executed by the processors, cause the plurality of distributed computing devices to perform operations. The operations may include propagating the training labels through the input graph using a sparsity approximation for label propagation, resulting in learned weights for respective node and label pairs, and automatically updating the source data set using node and label pairs selected based on the learned weights.

According to one aspect of the disclosure, a method includes initializing, for nodes in an input graph comprising labeled nodes and unlabeled nodes, learned label weights for a non-zero quantity q of labels per node, wherein an edge between two nodes in the input graph represents a similarity measure between the two nodes and adding additional edges between nodes in the input graph based on deep learning of a large corpus of text. The method may also include, for a first node in the input graph, sending the learned label weights for the first node to each neighbor in the input graph, receiving a set of q learned labels and respective learned label weights from each neighbor, updating the learned weights of labels for the first node based on an aggregation of the received learned label weights from the neighbors, and repeating the sending, receiving, and updating for a quantity of iterations. The method may further include determining, from the updated learned label weights for the first node, a first label with a learned label weight that meets or exceeds a threshold, and automatically updating a source data set with the first label, responsive to the determining.

Another aspect of the disclosure can be embodied on a computer-readable medium having recorded and embodied thereon instructions that, when executed by a processor of a computer system, cause the computer system to perform any of the methods disclosed herein.

One or more of the implementations of the subject matter described herein can be implemented so as to realize one or more of the following advantages. As one example, implementations easily add additional knowledge into a source dataset using a semi-supervised learning model. Some implementations may use a streaming sparsity approximation of the label distribution, which allows the system to efficiently propagate the labels even with the graph is large (e.g. millions of nodes and edges) or when the set of labels is large (e.g., thousands or even millions). In some implementations, the processing is parallelized so that the graph and processing is distributed across multiple computing devices. Implementations increase the quality of label propagation by augmenting the input graph with additional edges when the nodes in the input graph represent textual information. Augmentation includes learning latent semantic embeddings associated with the nodes using raw text and deep learning techniques.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1:
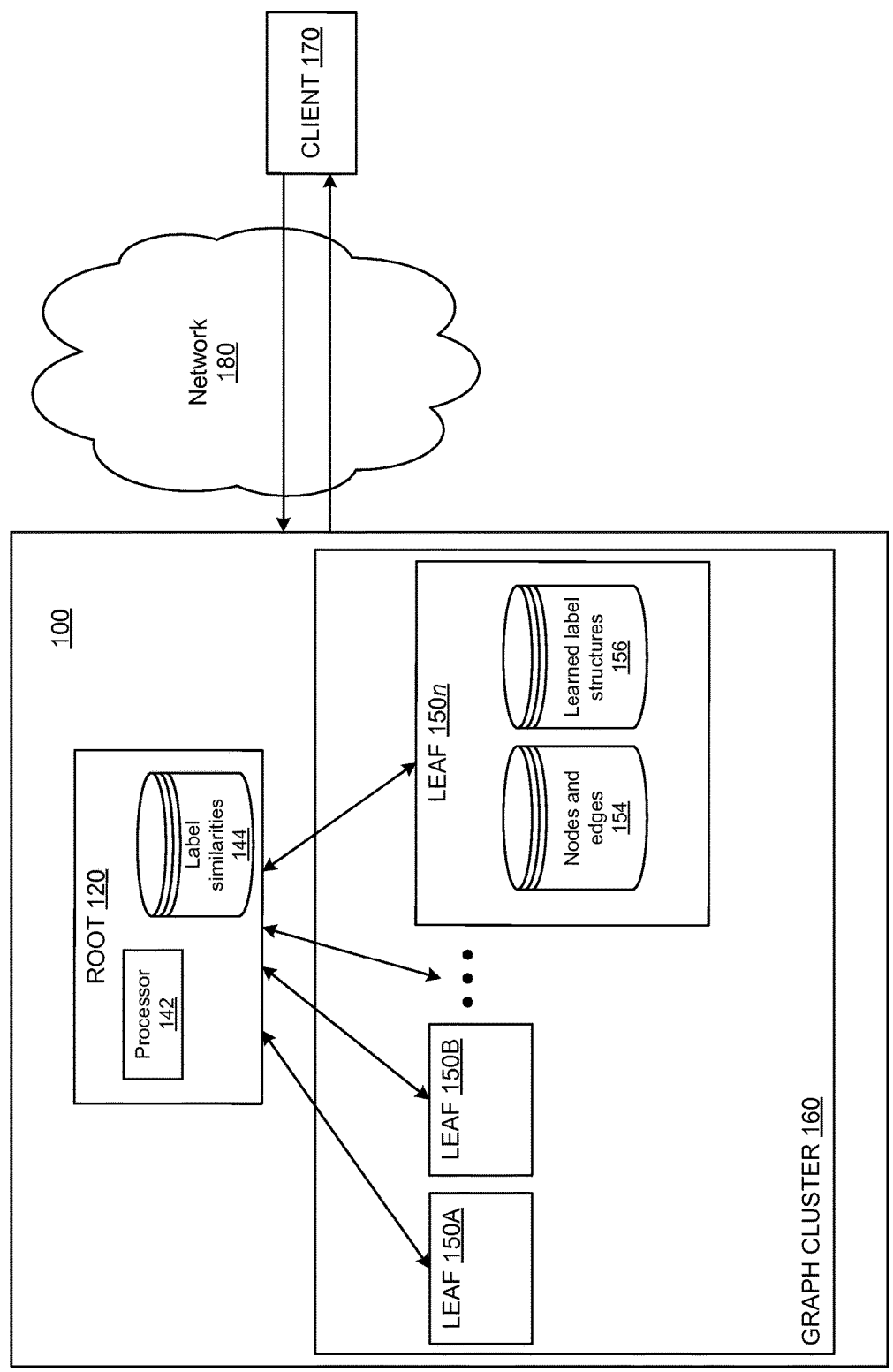
FIG. 1 illustrates an example system in accordance with the disclosed subject matter.
Figure 10:
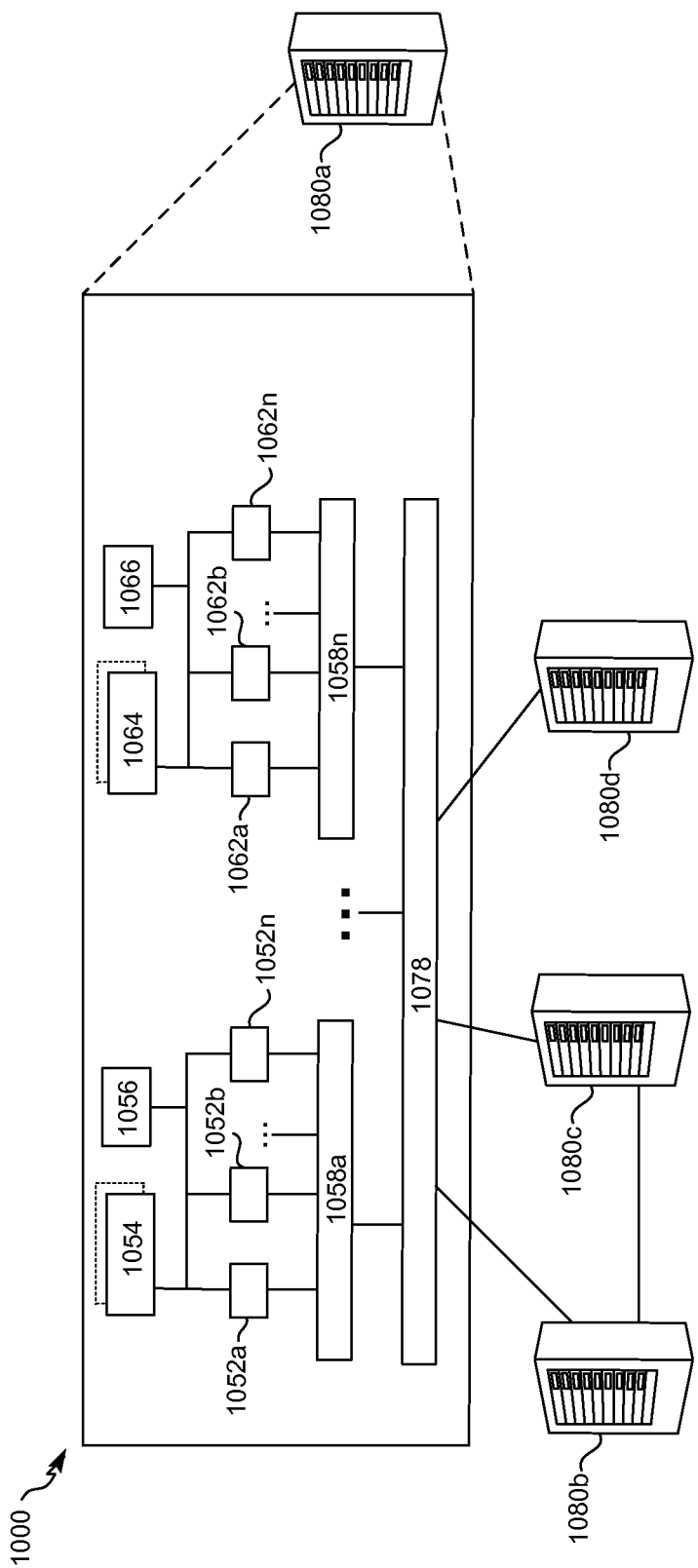
FIG. 10 shows an example of a distributed computer device that can be used to implement the described techniques.

FIG. 1 is a block diagram of a distributed graph system 100 in accordance with an example implementation. The system 100 may be used to learn additional labels for an input graph, effectively adding knowledge to a source graph using the techniques described herein. The graph system 100 may include root 120 and graph cluster 160. Root 120 and graph cluster 160 may be computing devices that take the form of a number of different devices, for example a standard server, a group of such servers, or a rack server system. In some implementations, the root 120 and the graph cluster 160 may be distributed systems implemented in a series of computing devices, such as a group of servers. In some implementations, the servers may be organized into a tree structure, with at least a root server 120 and leaf servers 150A to 150n. In some implementations (not shown), the tree may include intermediate servers, so that there are one or more layers between the root 120 and the leaf servers 150A to 150n. The root 120 and graph cluster 160 may be examples of computer device 1000, as depicted in FIG. 10.

The graph system 100 illustrated in FIG. 1 can operate over a large graph with, for example, billions of nodes. The root 120 may include one or more hardware processors 142 for one or more computing devices, such as servers, that operate with the graph cluster 160 to perform operations on the input data graph represented by nodes and edges 154. The root 120 may include one or more servers that receive commands or requests from a requester, such as client 170. The root 120 may initiate and monitor calculations performed on the graph and may manage the results of the calculations. In some implementations, the root 120 may receive and disseminate messages between nodes assigned to disparate leaves 150 in the graph cluster 160.

System 100 may also include a graph cluster 160. Graph cluster 160 may be a collection of distributed computing devices each with its own hardware processor and memory. The number of computing devices that comprise graph cluster 160 can vary. The graph cluster 160 may be divided into one or more leaf servers, such as leaf 150A, leaf 150B, leaf 150n, with n representing any positive integer. A leaf server may be associated with a logical division of nodes in the graph, with each graph node being assigned to a leaf server. Thus, a leaf server may correspond to one computing device, or a leaf server may be a logical computing device and may share a physical computing device with other leaves. In some implementations, a node's assigned leaf may change as the graph is updated, making leaf assignments flexible. The root 120 may determine which nodes are assigned to each leaf as the nodes are added to the graph or updated. The root 120 may also store label similarities 144, such as a matrix or paired list, that records and stores the similarity of one label to another label. The similarity of the labels may be based on any conventional similarity measure, such as cosine or other similar distance measures, etc. In some implementations, the root 120 may calculate label similarities 144 via random walks from seed nodes in the input graph, as explained herein.

The root 120 may route processing requests or messages to the leaf servers and act as the primary means of coordination between the leaves at processing time. Of course, leaves may send messages directly to each other, and nodes in the graph may send messages to each other as part of graph processing. In addition to the leaf servers, the graph cluster 160 may include one or more layers or intermediate servers between the root 120 and the leaf servers, but are not shown in FIG. 1 for the sake of brevity. Thus, for example, an intermediate server may be associated with, for example, 20 leaf servers. The intermediate server may be connected directly to the root, or there may be one or more additional layers between the intermediate server and the root 120. Thus, although FIG. 1 shows communications directly between the root and leaf servers, it is to be understood that intermediate devices may be used to direct communications and aggregate results using known methods, such as remote procedure calls. The root, intermediate, and leaf servers that make up the tree may, collectively, be referred to as the input graph.

Each of the leaf servers that make up graph cluster 160 can include node nodes and edges 154 and learned label structures 156. The nodes and edges 154 represent a partition of the input graph. Each node in the nodes and edges 154 may be assigned to a partition, e.g., a leaf. The nodes in the nodes and edges 154 may be labeled or unlabeled. A labeled node has one or more labels that are used as training labels. The labels of a labeled node each have an original weight that is a positive number. In some implementations, the original weights may be normalized so that the total of the original weights for a node sum to one. A labeled node is also referred to as a seed node. If a node in the nodes and edges 154 does not have a particular label l, the weight of label l for the node is zero. Thus, for unlabeled nodes, all original weights are zero for the node, while only labels not associated with a seed node have an original weight of zero for the seed node.

Learned label structures 156 may be used in propagating the training labels to other nodes in the graph. Each node in the input graph may have a respective learned label structure 156. In some implementations, the learned label structure 156 may have a learned label weight for each label in the set of possible labels. In some implementations, the learned label structure 156 may track label weights for a non-zero quantity k of labels, for example k=5 or k=10, using a sparsity approximation. The tracked k labels in a learned label structure 156 for a node represents the top-ranked, or most likely, labels for the node. In such an implementation, the system may store, as part of the learned label structure 156, an average probability mass of the remaining labels for the node. In other words, rather than storing an exact learned label weight for each label, the system may store an approximation of the learned label weight for labels that are not top-ranked. The average probability mass may be based on the sum of the weights for the top-ranked labels. For example, the average probability mass for a node v may be represented as $1.0 - \Sigma_{i=1}^{k} \hat{Y}_{vl_i}/m-k$ where k is the quantity of top-ranked labels tracked by the learned label structure, m is the quantity of labels in the set of labels for the input graph, and $\Sigma_{i=1}^{k} \hat{Y}_{vl_i}$ is the sum of the learned label weights of the top-ranked labels for node v. As a round of aggregation completes, the system 100 may update the top-ranked labels for each node v, the learned label weights of the top-ranked labels for node v, and average probability mass for node v, so that the learned label structure reflects the top k labels for the node for any particular round of aggregation.

The learned label structures 156 may be initialized using the original weights of the training labels. For example, a learned label structure 156 for a seed node would include data for the labels associated with the seed node in the input graph, e.g., the training labels of the seed node. The learned label weight in the learned label structure 156 may be the original weight of the label-node pair in the input graph. Any remaining weights may be set to the uniform distribution for the labels, e.g., 1/m where m is the quantity of labels in the set of labels. In some implementations, the system may initialize the average probability mass for seed nodes using the training labels as the top k labels. The remaining labels each have an equal learned label weight (e.g., 1/m), and the system may randomly select labels with this weight to fill the learned label structure with k labels, and then calculate the average probability mass. For an unlabeled node, the system may select k labels for the learned label structure for the node and set the average probability mass is 1/m.

To propagate the training labels the system 100 may utilize a Jacobi iterative algorithm, which defines the approximate solution at the $(i+1)^{th}$ iteration given the solution at the $i^{th}$ iteration. The initialized learned label structures 156 represent iteration zero (0), or i=0. The first iteration of the Jacobi iterative algorithm is thus provided with the initialized structures. The iterative algorithm aggregates the learned label weights of its neighbors based on how similar the neighbor is. The aggregation for label l of node v at iteration i may be represented by the following:

$$\frac{1}{M_{vl}}\left(\mu_1 s_{vv} Y_{vl} + \mu_2 \sum_{u \in N(v)} w_{vu} \sum_{l'} c_{ll'} \hat{Y}_{ul'}^{(i-1)} + \mu_3 U_l\right)$$

In the aggregation above, the first component is a seed component. In the seed component $\mu_1$ is a component weight, $s_{vv}$ is one (1) when the node v is a labeled node (e.g., has at least one label in the input graph) and zero otherwise, and $Y_{vl}$ is the original weight of the label in the input graph. The weight of the label l in the input graph is zero when the node v is not associated with label l before propagation begins. If label l has a non-zero weight in the input graph it is considered training data and propagated through the graph via the aggregation. In some implementations, the weight parameter $\mu_1$ may be set to 1. This ensures that a training label for a seed node retains its original weight.

The second component in the aggregation is a total neighbor component. In the total neighbor component $\mu_2$ is a component weight, $w_{vu}$ is a similarity measure between the node v and the neighbor u (e.g., it is the weight of the edge connecting nodes v and u in the input graph), $c_{ll'}$ is a similarity measure between label l and label l', $\hat{Y}_{ul'}^{(i-1)}$ is the weight of label l' in the learned label structure for node u at the previous or i-1 iteration. In other words, a node v receives the learned label structure from its neighbors and the received learned label structures represent values from a previous iteration, which are used to calculate the learned label weights of a current iteration at node v.

The label similarity measure $c_{ll'}$ may be any conventional similarity measure, including cosine, Jaccard, etc. The label similarity measure may be stored, for example, as label similarities 144. Label similarities may be stored as an m×m matrix, as a paired list, or in some other manner. Label similarities 144 may be accessible by each node, e.g., stored at the root 120 or at each leaf 150. In some implementations, the similarity measure between two labels may be provided. In some implementations the system 100 may obtain the similarity between two labels by taking a random walk starting from each seed node. For each random walk starting from seed node v, the terminate probability is $P_t$ and the probability of choosing a node u is $P_c(u)$, which can be represented by $1/(1+\exp(\propto d_{uv}))$ where $d_{uv}$ is the distance from the node u to the seed node v. The system may record all the numerical counts of the labels of the seeds along the path of the random walk, normalize the count, and compute the cosine similarity between each pair of labels based on the normalized matrix.

In some implementations, the total neighbor component may include a label distribution entropy parameter. The entropy parameter may enable the aggregation to devalue the contribution of an uncertain neighbor. A neighbor node may be uncertain because it did not receive much useful information in the previous iteration. The system 100 may calculate the entropy parameter $e_u$ for each neighbor u according to the following: $e_u^{(i-1)} = 1.0 - H(\hat{Y}_u^{(i-1)})$ where H represents the skewness of the distribution. The system may normalize the entropy parameter to [0,1]. When the label distribution entropy parameter $e_u^{(i-1)}$ for a node u is low, this indicates the node u is either far away from seed nodes or the node u itself is ambiguous (e.g., not very similar to any neighbors). Such a node may be considered untrustworthy and the system decreases its contribution to the total neighbor component. In an implementation that accounts for label distribution entropy, the total neighbor component may be expressed as $\mu_2 \Sigma_{u \in N(v)} e_u^{(i-1)} w_{vu} \Sigma_{l'} c_{ll'} \hat{Y}_{ul'}^{(i-1)}$.

The last component of the aggregation is a uniform distribution component. In the uniform distribution component, $\mu_3$ is a component weight and $U_l$ is a uniform distribution of label l (e.g., 1/m where m is the number of labels. To ensure that the weight does not exceed 1, the aggregation may divide the sum of the three components by a normalization constant, $M_{vl}$, for node v and edge l. The normalization constant may be expressed as $\mu_1 s_{vv} + \mu_2 \Sigma_{u \in N(v)} w_{vu} \Sigma_l c_{ll} + \mu_3$. In implementations that account for label distribution entropy, the entropy parameter may be included in the normalization constant, which can be expressed as follows:

$$\mu_1 s_{vv} + \mu_2 \Sigma_{u \in N(v)} e_u^{(i-1)} w_{vu} \Sigma_l c_{ll} + \mu_3.$$

The component weights $\mu_1$, $\mu_2$ and $\mu_3$ can be set to weight the various components. For example, $\mu_1$ may have a value of one (1) so that the original weight of a training label remains unchanged and highly weighted. The other parameters $\mu_2$ and $\mu_3$ can have small values, e.g., 0.01 or some other value much smaller than the value of $\mu_1$, so that to place a higher emphasis on the seed information. In some implementations, the component weights can be left out of the aggregation.

Graph system 100 may be in communication with clients 170 over network 180. Network 180 may be for example, the Internet or the network 180 can be a wired or wireless local area network (LAN), wide area network (WAN), etc., implemented using, for example, gateway devices, bridges, switches, and/or so forth. Via the network 180, the system 100 may communicate with and transmit data to/from clients 170 or other computing devices. The system 100 represents one example configuration, and implementations may incorporate other configurations.

Although not illustrated in FIG. 1, it is understood that the input graph, represented by the nodes and edges 154 on the leaves of the graph cluster 160, may be generated based on a source data set. The source data set may take on various forms. For example, one type of source data set is a public knowledge base, such as FREEBASE. A knowledge base may represent an entity, such as a person, place, item, idea, topic, abstract concept, concrete element, other suitable thing, or any combination of these, as a node in a graph. Entities in the knowledge base may be related to each other by edges, which represent relationships between entities. For example, in the knowledge base the nodes "Maryland" and "United States" may be linked by the edges of in country and/or has state. The system 100, or another system, may generate the input graph based on the nodes and/or edges in the knowledge base. As an example, a node in the input graph may represent a node or a node pair in the knowledge base. A label of a node pair may represent a relationship (e.g., labeled edge) from the knowledge base between the pair of nodes. For example, the knowledge base may have a node for "Paris" and a node for "France," and a labeled edge between the Paris node and the France node that represents a capital of relationship. Thus, the label capital of may be assigned to the <Paris, France> node in the input graph. Labels may also represent attributes of a node. For example, the node "Paris" may have an entity type of "City", which may be considered an attribute of the "Paris" node. Thus, "City" may be a label in the input graph for the node that represents the "Paris" entity. After the system 100 determines learned label weights for the nodes in the input graph, the learned label weights may be used to augment the knowledge base. For example, the system 100 may learn that the previously unlabeled "London" node has a high likelihood (e.g. a high learned label weight) of having a capital of relationship with and "England" node and reflect this in the knowledge base. As one example, overlap of entities contained in the capital of relationship could be used to compute the edge similarity.

Other data sets may be used to generate the input graph. For example, a classification data set may be used as the source for the input graph. A classification data set may classify entities into categories. For example, one classification data set may include grammars (e.g. rules to identify certain types of strings) associated with certain tasks. Such a data set may have the strings (e.g., any text input) "buy milk", "get bread" and "toothpaste" that satisfy the grammars for a "Grocery Purchase" task. The strings may become nodes in the input graph and the category may become the label. Thus, a "buy milk" node in the input graph may have a "Grocery Purchase" label, as well as additional labels. Any strings that have not yet been assigned to a category may be unlabeled nodes in the input graph. The system 100 (or another system) may generate an edge in the input graph when a string shares a word or matches a pattern or a rule with another string. The weight of the edge may be based on a similarity measure between the two strings, such as cosine or Jaccard, etc. After the system 100 determines learned label weights for the nodes in the input graph, the learned label weights may be used to augment the source data set. For example, the system 100 may learn that the previously unlabeled "buy bread" node has a high likelihood (e.g. a high learned label weight) of being a "Grocery Purchase" and reflect this in the source data set. Of course the classification data set may classify other entities, such as movies, documents, etc. using other grammars.

Figure 2:
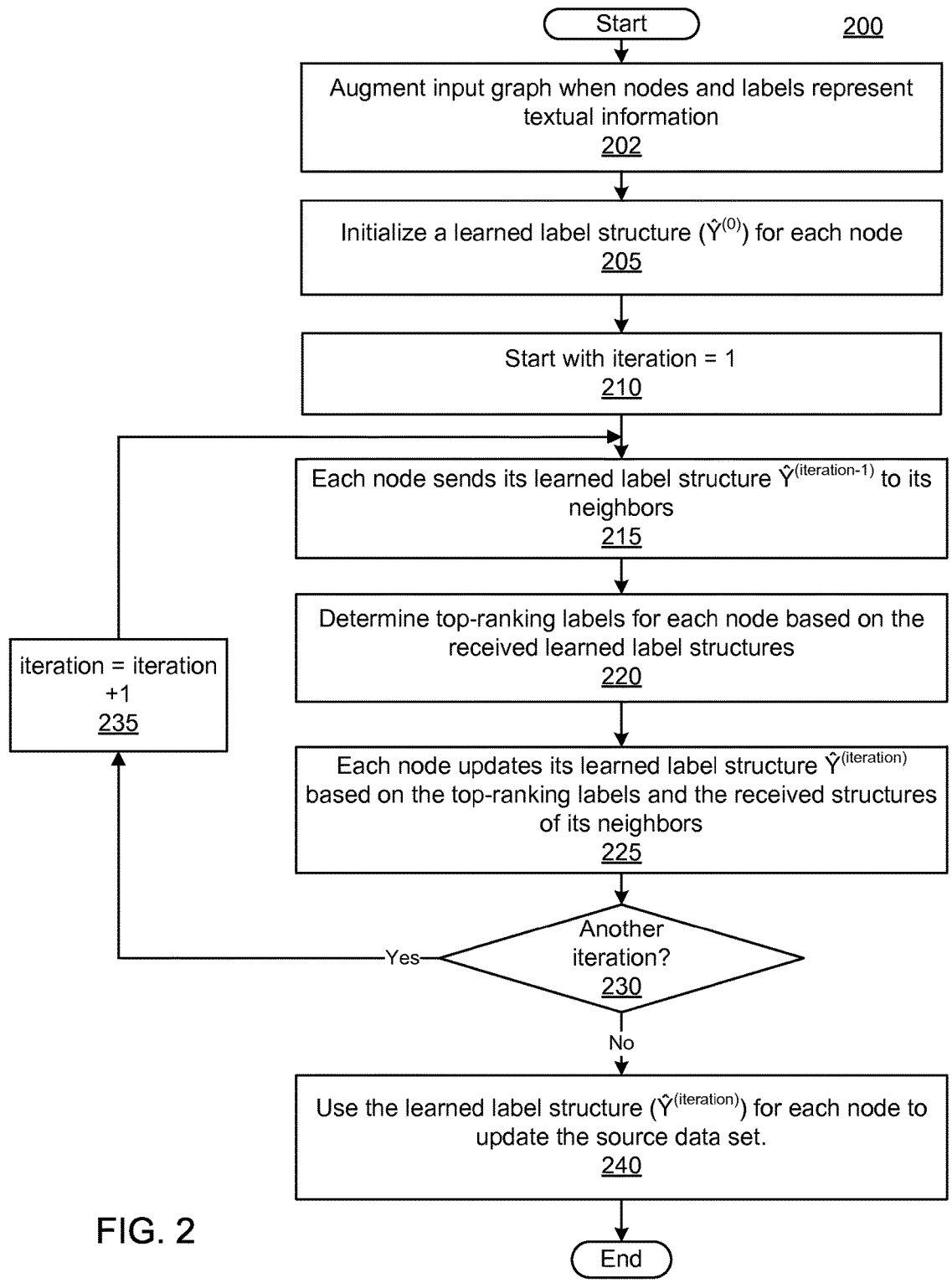
FIG. 2 illustrates a flow diagram of an example iterative process for propagating labels of seed nodes to unlabeled nodes in an input graph, according to an implementation.

FIG. 2 illustrates a flow diagram of an example process 200 for propagating labels of seed nodes to unlabeled nodes in an input graph, according to an implementation. The process 200 shown in FIG. 2 may be performed by a graph system distributed across multiple computing devices, such as graph system 100 of FIG. 1. The process 200 is an iterative process that propagates seed labels through an input graph in a semi-supervised manner. The result of the propagation is learned label weights for the nodes of the input graph. The learned weight for a specific label-node pair represents a probability that the node can be appropriately associated with the label. Therefore, the system may use learned label weights to automatically add knowledge to a source data set. The process may begin with the system augmenting the edges in an input graph when the nodes and labels represent textual information (202). The augmentation may be based on deep learning applied to a large text corpus, as explained with regard to FIG. 3.

The system may then initialize a learned label structure $\hat{Y}_v$ for each node v in the input graph (205). The initialized learned label structures represent iteration 0 (or i=0). Thus, in the first iteration of propagating labels (e.g., i=1), the previous iteration is the initialized learned label structures. In some implementations, the learned label structure may track a learned label weight for each node for each label. In such an implementation, for each unlabeled node, the system may set the learned label weight of each label to 1/m, where m is the quantity of labels in the label set for the input graph. For each labeled node, the system may set the learned label weight of a training label (e.g., a label associated with the node) to the original weight of the label in the input graph. For all other labels in the learned label structure for the seed, the system may set the label weight to 1/m. In some implementations, the learned label structure for a node may be an array, with each entry in the array representing a learned label weight for a label. The notation $\hat{Y}_{vl}$ can be used to refer to an entry in the array, or in other words, the learned label weight of label l for node v.

In some implementations, the learned label structure $\hat{Y}_v$ may track only the top k labels for each node v, where k is a non-zero integer much smaller than m (the total number of labels in the set). For example, k may be five or 10 where m may be over 1000. The learned label structure for a node may thus include a label identifier and an associated learned label weight for k labels. Such an implementation uses a steaming sparsity approximation to improve scalability. In initializing the learned label structures for a seed node in a sparsity approximation implementation, the system may include all training labels for the seed node in the learned label structure, setting the learned label weight to the training label weight for the node (e.g., the original weight in the input graph). If the seed node does not have k total training labels, the system may randomly select from the remaining set of labels to fill the learned label structure with k labels, setting the label weight of the randomly selected labels to 1/m. For unlabeled nodes, the system may select the first k labels or may select k random labels and set the label weight to 1/m. In sparsity approximation implementations, the learned label structure may optionally include an average probability mass for the node. The system may use the average probability mass as a dynamic threshold that changes for each node for each iteration. The system may initialize the average probability mass to (1−the sum of the label weights in the top k labels for the node) divided by (m−k). For unlabeled nodes, this will always be 1/m initially. For seed nodes, the average probability mass will depend on the training label weights and the number of training labels. Setting the average probability mass may be represented as $$1.0 - \sum_{i=1}^{k} \hat{Y}_{vl_i}/m - k.$$

Once the learned label structures are initialized, the system may begin iterations, starting with the first iteration, or i=1 (210). As a first step in each iteration, each node may send its learned label structure to each of its neighbors (215). Of course, if the input graph is not distributed (e.g., is running on a single computing device), the system may omit this step, as each node has access to every other nodes' learned label structure. The sending of learned label structures occurs in parallel, for example using Pregel, Giraph, MapReduce, or another message-based distributed processing system. In such a system, a programmer provides the instructions or method that each node executes during each round (or iteration). Step 215 may thus be considered a first round in the message-based distributed system.

In implementations that use sparsity approximation, each node determines its own top-ranking labels using the received learned label structures from its neighbors (220). The top-ranking labels may be based on the frequency with which a label is seen from a node's neighbors and the learned label weights for the label, as discussed in more detail herein with regard to FIG. 4. Each node then updates its own learned label structure using the received structures of its neighbors (225). In some implementations, the node v updates the learned label weight for every label. In implementations that use sparsity approximation, the system updates the label weights of the top-ranked labels for this round, e.g., determined in step 220. In doing so, the system may discards any entries in the learned label structure from the previous round that are no longer top-ranked for the node. In such an implementation, the system may also re-calculate the average probability mass for the node based on the updated label weights. This may be done the same way the average probability mass was initially calculated, but using the recently determined top-ranking labels (e.g., the ones determined in step 220).

The system may determine whether to perform another iteration (230). In some implementations, the system may perform a predetermined number of iterations. In some implementations, the system may tie the number of iterations to a percentage or quantity of unlabeled nodes that have labels with a label weight meeting a threshold. Of course the system may use some other method of determining whether to perform another iteration. If another iteration is performed (230, Yes), the system increases the iteration count and the nodes send their updated learned label structure to their neighbors and use received learned label structures from neighbors (which represent a prior iteration) to update the learned label structure again. In other words, the system repeats steps 215 to 230. When the system determines no additional iterations are to be performed (230, No), the system may use the learned label structures for each node to update the source data set (240). For example, when a learned label weight for a label-node pair meets a threshold the system may automatically associate the label with the node. In some implementations, this may include assigning a node to a category, where labels represent categories, in the source data set. In some implementations, this may include adding a relationship between two nodes, where the label represents the relationship and the node v represents a pair of nodes from a source graph. Process 200 then ends.

Figure 3:
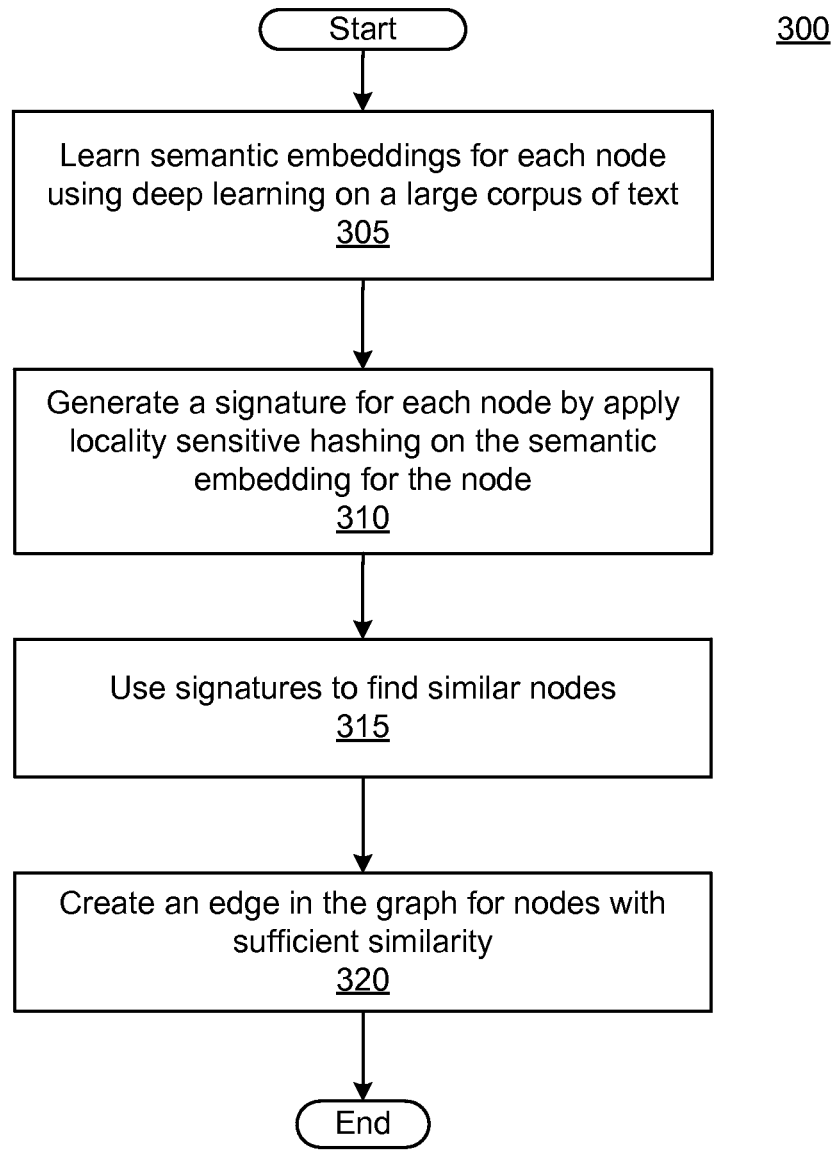
FIG. 3 illustrates a flow diagram of an example process for adding additional edges to an input graph, according to an implementation.

FIG. 3 illustrates a flow diagram of an example process 300 for adding additional edges to an input graph, according to an implementation. The process 300 shown in FIG. 3 may be performed as part of step 202 of FIG. 2. The process 300 augments the edges of the input graph using deep learning to generate semantic embeddings using a large corpus of raw text to identify similar nodes. The additional edges may increase the quality of the learned label weights during the iterative aggregation described above with regard to FIG. 2. To begin, the system may learn semantic embeddings for each node using deep learning on a large corpus of text (305) using conventional techniques. The system uses the semantic embeddings to calculate a similarity measure between each pair of nodes in the graph. But in a large graph computing the similarity of the semantic embeddings over each pair of nodes is computationally infeasible. Accordingly, the system may use locality sensitive hashing (LSH) to approximate similarity. The system may generate a signature for each node by applying locality sensitive hashing on the semantic embedding of the node (310). The system may hash each embedding vector point into a signature in such a way that similar vectors share the same signature with a high probability. The system may use the signatures to find similar nodes (315). For example, for each signature, the system may use D bits, and for each bit d in D, generate a hyperplane in the embedding space using a random spherical coordinates $r_d$. For node v, if the product of the embedding vector and the random spherical coordinates is greater than zero, the system may set the $d^{th}$ bit as 1, otherwise zero. Increasing D can reduce the amount of time to compute similarity (e.g., cosine) but leads to misstating the pair of nodes whose similarity are larger than $\theta_{sim}$. Accordingly, the system may repeat the randomization procedure W times, maintaining W hash tables (each with D independently chosen random hyperplanes). This increases the chance that similar embedding vectors share the same signature. The system may then compute the similarity (e.g., cosine) between a pair of nodes, if they are at least one signature in common (among the W×D hash tables). When the similarity meets a threshold, the system creates an edge in the input graph between the pair of nodes. The weight of the edge will be the similarity measure. Process 300 then ends, having augmented the edges in the input graph.

Figure 4:
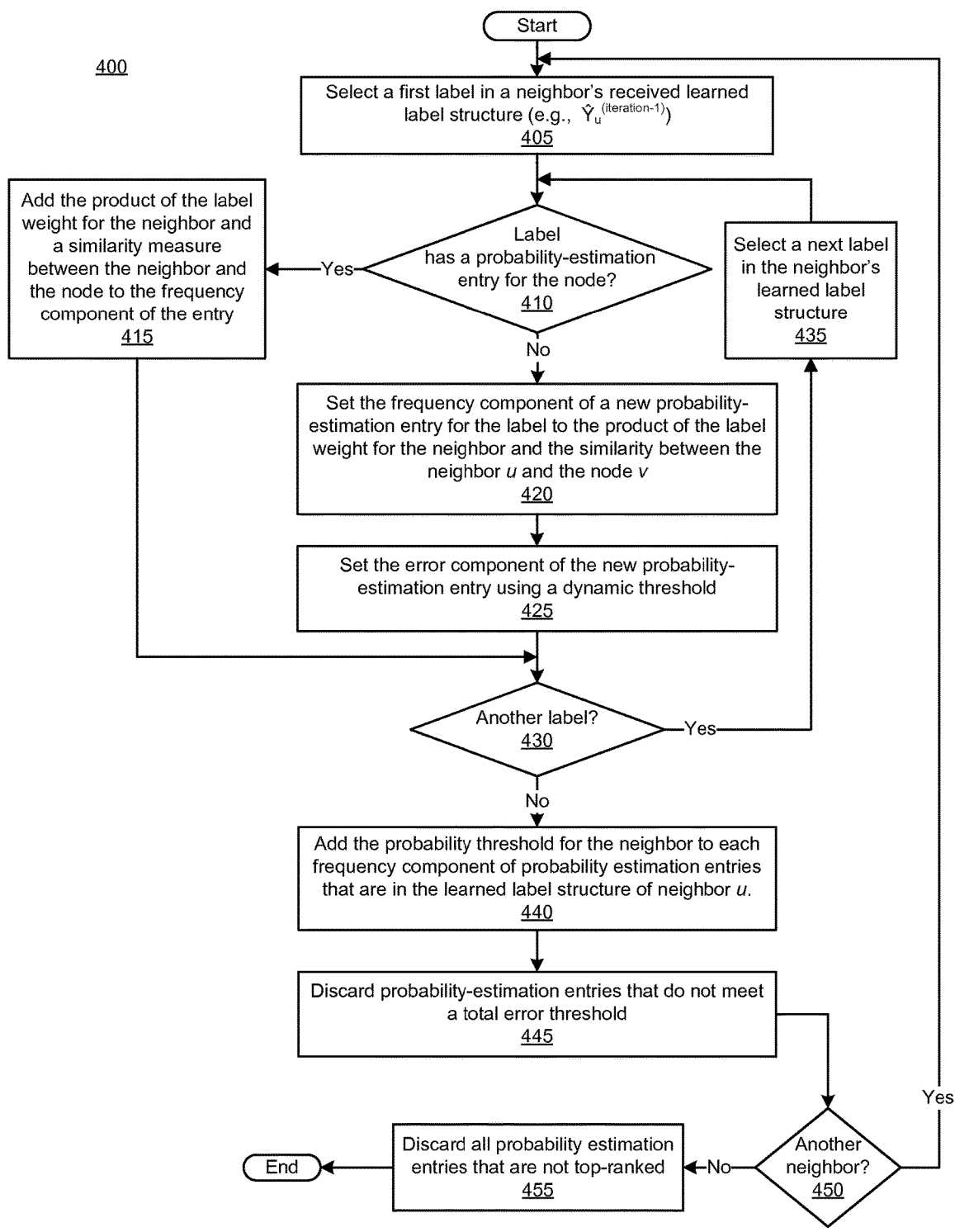
FIG. 4 illustrates a flow diagram of an example process for determining top-ranked learned labels for a node during an iteration of the propagating, according to an implementation.

FIG. 4 illustrates a flow diagram of an example process 400 for determining top-ranked learned labels for a node during an iteration of the propagating, according to an implementation. The process 400 may be performed as part of step 220 of FIG. 2. The process 400 is an example of a streaming sparsity approximation that enables the system to determine and track the top ranking k labels in each iteration of a label propagation method rather than tracking all m labels. Process 400 represents a streaming sparsity approximation at one node, labeled v in the FIG. 4. It is understood that each node in the input graph may perform process 400 simultaneously. In some implementations, a node may perform process 400 as it receives a learned label structure from a neighbor. Prior to performing process 400 as part of an iteration (e.g., once per iteration), the node v initializes a list of probability-estimations, making the list empty. In other words, at the beginning of each iteration, before any learned label structures from neighbors are received, the node v may have no probability-estimation entries. A probability-estimation entry includes three components. The first component is the label identifier. The second component is a frequency component representing a frequency-based weighted probability for the label and the last component is an error component, representing a maximum error of the frequency component.

Process 400 begins when the node v selects a first label in a received learned label structure for neighbor u (405). The received label structure includes a learned label weight for k different labels (k>1 and <<number of labels in the set of labels) and may also include an average probability mass for the neighbor u. The system may determine if the selected label l has an entry in the probability-estimation list for the node v (410). If this is the first neighbor the node v has seen label l in a neighbor's learned label structure there will no entry for the label. If there is an entry for label l in the probability-estimation list (410, Yes), the system may add the product of the similarity between node n and neighbor u and the learned label weight for the label l in the learned label structure of neighbor u to the frequency component of the entry (415). The product may also be represented by $w_{vu}\hat{Y}_{ul}^{(i-1)}$, where i represents the current iteration and i−1 represents the previous iteration and $w_{vu}$ is the weight of the edge between node v and u in the input graph. If there are other labels in the learned label structure for u that have not been selected (430, Yes), the system may select the next label (435) and repeat steps 410 to 425 for the next label.

If there is no entry (410, No), the system may create or generate a probability-estimation entry for the label. The system may set the frequency component of the probability-estimation entry to the product of a similarity between node n and neighbor u and the learned label weight for the label l in the learned label structure of neighbor u (420). The product may also be represented by $w_{vu}\hat{Y}_{ul}^{(i-1)}$, where i represents the current iteration and i−1 represents the previous iteration and $w_{vu}$ is the weight of the edge between node v and u in the input graph. The system may also set the error component of the new entry in the probability-estimation list (425). In some implementations, the error component may be a product of a probability threshold and the sum of the similarities between node n and the previously seen neighbors. In other words, if node n has t neighbors, the first learned label structure the node n selects is for neighbor to. When the node n has finished steps 405 to 445 for neighbor to, the node n moves on to neighbor $u_2$. At this point, $u_1$ is a previously seen neighbor. When node n moves to neighbor $u_2$, neighbors $u_1$, $u_2$, and $u_3$ are previously seen neighbors, etc. Thus, the error component may be represented as $\Sigma_{i=1}^{t-1}\delta w_{vu_i}$, where the current neighbor u is $u_t$. The probability threshold $\delta$ may be a dynamic threshold or a static threshold. For example, the probability threshold $\delta$ may be set to a uniform distribution of the labels (e.g., l/m). This is a static threshold because it is the same for all neighbors. In some implementations, the probability threshold $\delta$ may be dynamic, in that it changes for each neighbor. The dynamic threshold may be the average probability mass for neighbor u, which can be provided in the learned label structure for neighbor u or can be calculated from the learned label structure. For example, the average probability mass for neighbor u ($\delta_u$) may be expressed as $$1.0 - \sum_{i=1}^{k} \hat{Y}_{ul_i}^{(i-1)} / m - k$$

As discussed above, in an implementation that uses a sparsity approximation, the learned label structure of a neighbor may have k labels. Thus, $\Sigma_{i=1}^{k}\hat{Y}_{ul_i}^{(i-1)}$ represents the sum of the learned label weights in the learned label structure of neighbor u. After setting the error component, the system determines if there is another label to process (430). If there is another label to process (430, Yes), the next label from the learned label structure for u is selected (435) and steps 410 to 430 are repeated for the next label.

If all k labels in the learned label structure for neighbor u have been selected (430, No), the system may add the probability $\delta$ to the frequency component of each probability-estimation entry for a label that is not in the learned label structure of node u (440). In other words, if label l identified in an entry of the probability-estimation list does not exist in $\hat{Y}_u$, the system may add $\delta$ to the frequency component of the entry for label l. The probability threshold may be static or dynamic, as discussed above.

The system may then inspect each entry in the probability-estimation list and discard entries that do not meet a total error threshold. The total error threshold may be a sum of the product of the probability threshold and the similarity of the current neighbor (e.g., $u_t$) and each previous neighbor (e.g., $u_1$ to $u_{(t-1)}$). The total error threshold may be expressed as $\Sigma_{i=1}^{t}\delta w_{vu_i}$, where the probability threshold $\delta$ is either dynamic (e.g., specific to the neighbor) or static, as described above. An entry in the probability-estimation list does not meet the threshold when the sum of the frequency component and the error component are less than the threshold.

If the node v has another neighbor (450, Yes), the system may repeat steps 405 to 445 for the next neighbor. Otherwise (450, No), the system may determine the k top-ranked probability-estimation entries based on the sum of the frequency component and the error component (455). Any entries that are not in the top k can be deleted. The labels of the remaining entries are the top-ranked labels for node v and the system will update the learned label weight for these labels, as described in more detail with regard to FIG. 6. Process 400 then ends, having identified the top k labels for the node v. It is understood that each node in the input graph may perform process 400 and the processing may be concurrent.

Figure 5:
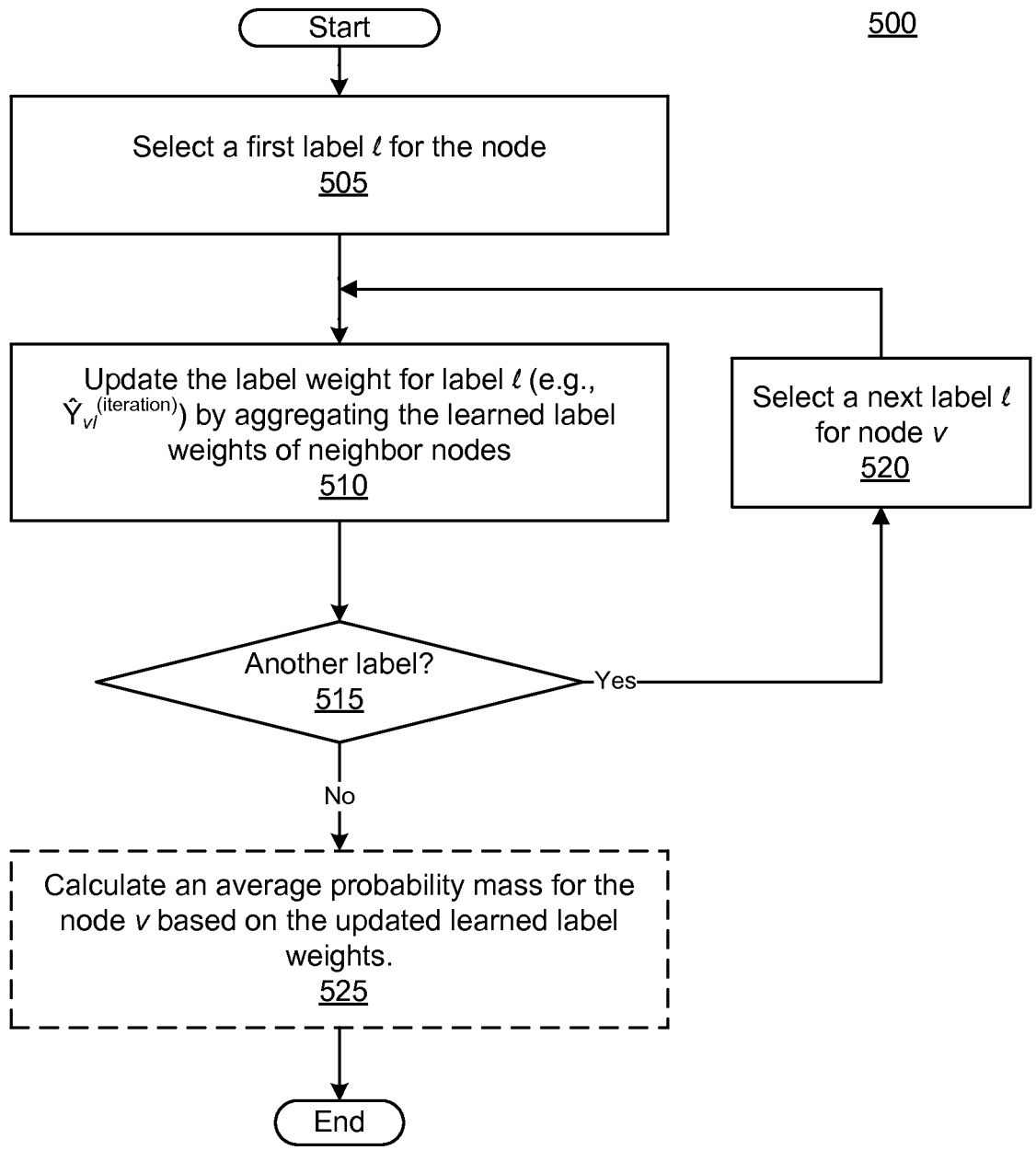
FIG. 5 illustrates a flow diagram of an example process for updating label weights, according to an implementation.

FIG. 5 illustrates a flow diagram of an example process 500 for updating label weights, according to an implementation. The process 500 may be performed as part of step 225 of FIG. 2. The process 500 is illustrated for a single node v, but it is understood that each node may independently perform process 500. Process 500 (along with optional process 400) may be considered a second round in a message-based distributed system using, for example, Pregel, Giraph, MapReduce, etc. Process 500 may select a first label for the node v (505). In a sparsity approximation implementation, the first label may be selected from the probability-estimation list for the node v, as discussed above with regard to step 455 of FIG. 4. In other implementations, the label may be selected from the learned label structure for node v. The system may then update the learned label weight of the selected label l by aggregating the learned label weights of neighbor nodes (510). The learned label weights for neighbors represent label weights from a prior iteration, which were received in this iteration round from the neighbors, as described with regard to FIG. 2. The learned label weights for a neighbor may be represented by the notation $\hat{Y}_u^{(iteration-1)}$ The updated learned label weight for the label l and node v may be represented by the notation $\hat{Y}_{vl}^{(iteration)}$.

The system may determine if the node v has any additional labels to be updated (515). In some implementations, the additional labels may be in the probability-estimation list for the node and process 500 may update leaned label weights for at most k labels (where k>0 and <<m, the total number of labels in the label set). In some implementations, the system may update learned label weights for all labels for node v (e.g., m labels). If there is another label (515, Yes), the system may select the next label and perform step 510 for the next label. Once the system has updated the learned label weight for the top-ranked k labels or all m labels, depending on the implementation, (515, No), the system may optionally calculate an average probability mass for the node v based on the updated learned label weights of the top-ranked k labels (525). The average probability mass may be calculated as $$\left(1.0 - \sum_{i=1}^{k} \hat{Y}_{vl_i}^{(i)}\right) / m - k,$$

where $\hat{Y}_{vl_i}^{(i)}$ represents the updated learned label weights for the top-ranked k labels for node v and m is the number of labels in the label set. In some implementations, the average probability mass for node v may be stored, for example in the learned label structure for node v and may be passed to neighbors with the learned label structure. In some implementations, the average probability mass is calculated, when needed, from the learned label structure. Process 500 then ends for node v. It is understood that each node may perform process 500 to update its own respective learned label structure. It is also understood that process 500 may be performed by each node in a concurrent manner (e.g., the nodes do not need to wait for another node to perform process 500).

Figure 6:
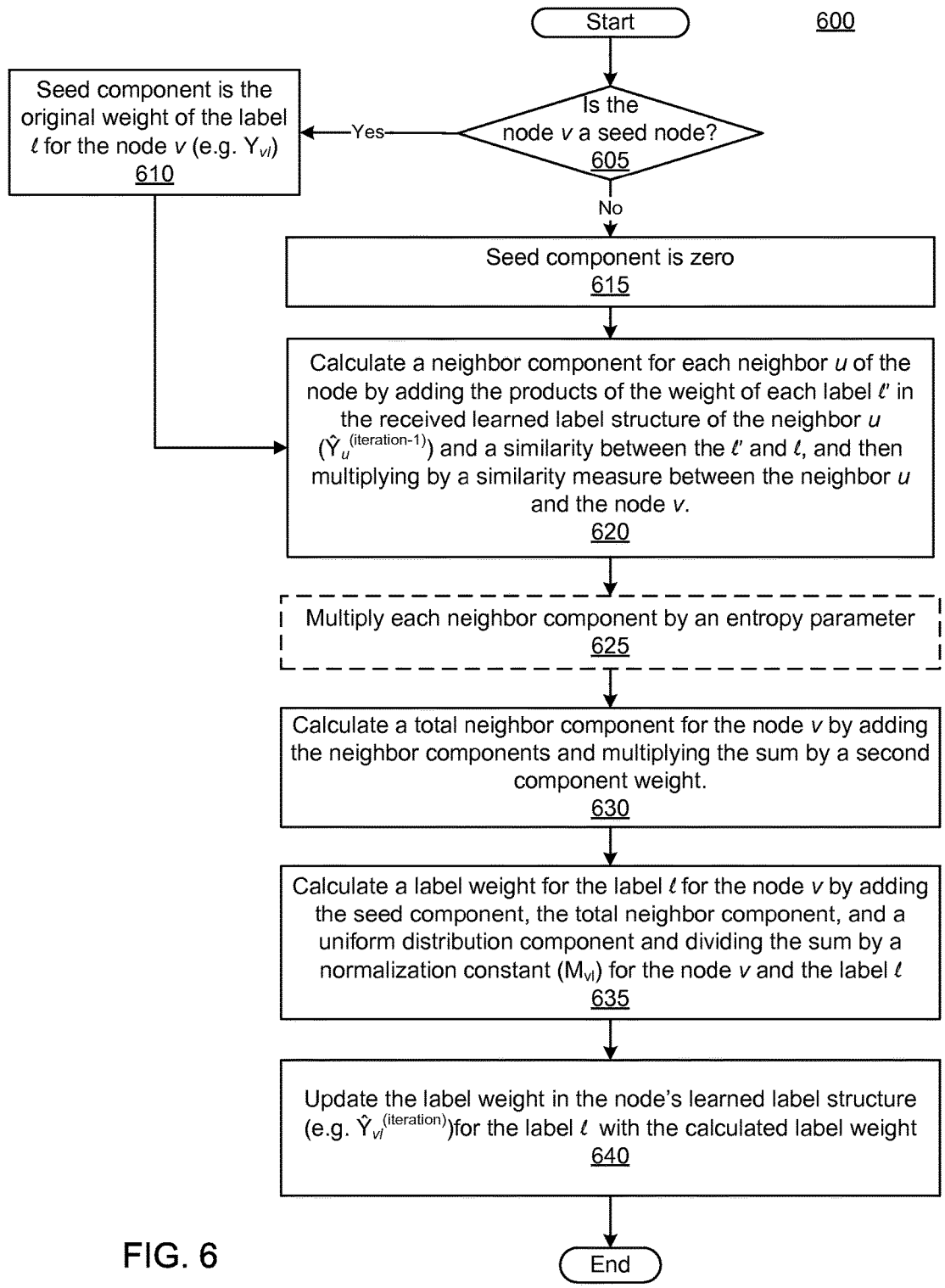
FIG. 6 illustrates a flow diagram of an example process for updating a learned label weight for a node by aggregating the learned label weights of neighbor nodes, according to an implementation.

FIG. 6 illustrates a flow diagram of an example process 600 for updating a learned label weight for a node by aggregating the learned label weights of neighbor nodes, according to an implementation. The process 600 may be performed as part of step 510 of FIG. 5. The process 600 is illustrated for a single node v and label l, but it is understood that node v may perform process 600 for at least k labels and as many as m labels. The updated label weight includes the sum of three components: a seed component, a total neighbor component, and a uniform distribution component. Process 600 determine whether the node v is a seed, or labeled, node (605). A seed node is a node that has at least one associated label (e.g., training label) in the input graph. If the node v is a seed node (605, Yes), the system may set the seed component (610) according to the following: $\mu_1 Y_{vl}$, where $Y_{vl}$ represents the original weight of label l for node v in the input graph (e.g., before propagation began), and $\mu_1$ is a first component weight. In some implementations, $\mu_1$ may have a value of one (1) and, therefore, the seed component is equal to the original weight of label l for node v. It is noted that if label l is not a training label for node v it will have an original weight of zero. If the node v is not a seed node (605, No), the system sets the seed component to zero (615).

The system next calculates a neighbor component for each neighbor u of the node v (620). The neighbor component may be expressed as $w_{vu}\Sigma_{l'} c_{ll'} \hat{Y}_{ul'}^{(i-1)}$ where $w_{vu}$ is a similarity measure between node v and neighbor u, $c_{ll'}$ is a similarity measure between label l and l' (which is 1 if label l' is label l), $\hat{Y}_{ul'}^{(i-1)}$ is the learned label weight of label l' in the learned label structure for node u (which was sent to node v). In other words, the neighbor component for neighbor u is the sum of the products of the weight of each label l' in the received learned label structure of the neighbor u and a similarity between the l' and l multiplied by a similarity measure between the neighbor u and the node v.

The system may optionally multiply each neighbor component by an entropy parameter (625). The entropy parameter may be specific to each neighbor u and may represent the trustworthiness of the neighbor u. The trustworthiness may be based on the entropy of the neighbor's label distribution in the last iteration (e.g., i−1). In some implementations, the entropy parameter may be expressed as $e_u^{(i-1)} = 1.0 - H(\hat{Y}_u^{i-1})$. The entropy parameter provides higher quality learned label weights by decreasing the effect of a node that is far from seed nodes or is not that similar to the seed nodes. In implementations that use an entropy parameter, the neighbor component for neighbor u may be expressed as $e_u^{(i-1)} w_{vu} \Sigma_{l'} c_{ll'} \hat{Y}_{ul'}^{(i-1)}$. Thus, the system can calculate the entropy parameter for the neighbor u and multiply the neighbor component for neighbor u by the entropy parameter.

The system may calculate a total neighbor component for the node v by adding the neighbor components together and multiplying the sum by a second component weight (630). The second component weight is a weight assigned for the total neighbor component. In some implementations this weight may be small, for example 0.01. The system may calculate a label weight for the label l of node v by adding the seed component, the total neighbor component, and a uniform distribution component (635), This sum may be divided by a normalization constant for the node v and the label l to ensure that the calculated weight does not exceed one, which represents a 100% probability. The uniform distribution component may be the product of a third component weight and the uniform distribution of the labels (e.g., 1/m). The third component weight may be small, for example 0.01. The uniform distribution component may be expressed as $\mu_3 U_l$, where $U_l$ is the uniform distribution of label l, or 1/m. The normalization constant for label l and node v may be expressed as $\mu_1 s_{vv} + \mu_2 \Sigma_{u \in N(v)} w_{vu} \Sigma_{l'} c_{ll'} + \mu_3$, where $s_{vv}$ is one (1) if the node v is a seed node and zero (0) otherwise.

The system may update the learned label weight for label l in the learned label structure of node v with the calculated label weight (640). Process 600 then ends for this label and the node v may perform process 600 for another label. It is understood that each node in the input graph will perform process 600 for at least k different labels and as many as m labels. Process 600 may also be represented by the following (which uses notation described above):

$$\hat{Y}_{vl}^i = \frac{1}{M_{vl}^i}\left(\mu_1 s_{vv} Y_{vl} + \mu_2 \sum_{u \in N(v)} w_{vu} \sum_{l'} c_{ll'} \hat{Y}_{ul'}^{i-1} + \mu_3 U_l\right)$$

In implementations that use an entropy parameter to decrease the contribution of a neighbor that is unreliable because it is far from any seed nodes and/or not that similar to a seed node (e.g., is ambiguous), process 600 may be represented by the following:

$$\hat{Y}_{vl}^i = \frac{1}{M_{vl}^i}\left(\mu_1 s_{vv} Y_{vl} + \mu_2 \sum_{u \in N(v)} e_u^{i-1} w_{vu} \sum_{l'} c_{ll'} \hat{Y}_{ul'}^{i-1} + \mu_3 U_l\right)$$

where $$M_{vl}^i = \mu_1 s_{vv} + \mu_2 \sum_{u \in N(v)} e_u^{i-1} w_{vu} \sum_{l'} c_{ll'} + \mu_3_l$$

Performance Evaluation

Processing times for propagating labels using various implementations described above were evaluated and found to be much faster and more scalable than conventional semi-supervised learning techniques, such as MAD and MAD-SKETCH. MAD has been shown to outperform traditional graph-based semi-supervised learning algorithms (e.g., "Experiments in graph-based semi-supervised learning methods for class-instance acquisition," Proceedings of the 48th Annual Meeting of the Association for Computational Linguistics, ACL 2010, pp. 1473-1481, 2010). MAD-SKETCH is similar to MAD but further approximates the label distribution on each node using Count-min Sketch to reduce the space and complexity. The size of the graphs tested appear in Table 1 below:

TABLE 1

| Source Data Set | Number of Nodes | Number of Edges | Number of Labels |
|---|---|---|---|
| Freebase-Entity | 301,638 | 1,155,001 | 192 |
| Freebase-Relationship | 9,367,013 | 16,817,110 | 7664 |
| Freebase-Relationship Subset | 4,479,390 | 7,379,508 | 1000 |

The Freebase-Relationship Subset includes a random sample of 1000 labels from the Freebase-Relation data set, keeping only entity-pair nodes which belong to the 1000 selected labels and the edges connected to those entity-pair nodes.

For the tables below, EXPANDER refers to implementations that do not use a sparsity approximation, do not augment edges, and does not consider entropy of each neighbor; EXPANDER-W refers to implementations that do consider entropy of each neighbor, EXPANDER-A refers to implementations that augment edges based on deep learning. Table 2 illustrates the comparison of mean-reciprocal rank (MMR) and precision scores between MAD and various implementations using the Freebase-Entity data set as the source data set. Precision measures the accuracy of the top-ranking learned labels at each iteration, e.g., P@5 is the precision at the 5th iteration. In Table 2, the input graph included 5 seeds per label and in Table 3 it is 10 seeds per label.

TABLE 2

|  | MMR | P@1 | P@5 | P@10 | P@20 |
|---|---|---|---|---|---|
| MAD | 0.2485 | 0.1453 | 0.3127 | 0.4478 | 0.5513 |
| EXPANDER | 0.3271 | 0.2086 | 0.4507 | 0.6029 | 0.7299 |
| EXPANDER-W | 0.3343 | 0.2215 | 0.4278 | 0.6041 | 0.7342 |
| EXPANDER-A | 0.3727 | 0.2301 | 0.4799 | 0.6176 | 0.7384 |

TABLE 3

|  | MMR | P@1 | P@5 | P@10 | P@20 |
|---|---|---|---|---|---|
| MAD | 0.2790 | 0.1988 | 0.3496 | 0.4663 | 0.5604 |
| EXPANDER | 0.3348 | 0.1994 | 0.4701 | 0.6506 | 0.7593 |
| EXPANDER-W | 0.3415 | 0.2145 | 0.4591 | 0.6439 | 0.7562 |
| EXPANDER-A | 0.3727 | 0.2344 | 0.5173 | 0.6654 | 0.7679 |

Table 4 illustrates a scalability comparison that takes into account running time and space usage. The more time the label propagation takes to complete, the less scalable it is because increased labels can make the propagation too slow to be useful. Similarly, the more memory a label propagation method uses the less likely the method will be to work for larger graphs. In Table 4, the input graph includes 5 seeds per label and used the Freebase-Entity data set as the source data set. As indicated above, EXPANDER-S represents implementations with a sparsity approximation as discussed herein (where k is the quantity of top-ranked labels tracked per node). MAD-Sketch uses a Count-min Sketch. A Count-min Sketch approximation approximates the whole label distribution for each node. MAD and EXPANDER do not use sparsity approximation or Count-min sketch.

TABLE 4

|  | MMR | P@1 | P@5 | P@10 | P@20 | Time (s) | Space (G) |
|---|---|---|---|---|---|---|---|
| MAD | 0.2790 | 0.1988 | 0.3496 | 0.4663 | 0.5604 | 206.5 | 9.10 |
| EXPANDER | 0.3348 | 0.1994 | 0.4701 | 0.6506 | 0.7593 | 256.4 | 1.34 |
| MAD-Sketch (w = 20, d = 3) | 0.2041 | 0.1285 | 0.2536 | 0.3133 | 0.4528 | 30.0 | 1.2 |
| MAD-Sketch (w = 109, d = 3) | 0.2516 | 0.1609 | 0.3206 | 0.4266 | 0.5478 | 39.8 | 2.57 |

TABLE 4-continued

|  | MMR | P@1 | P@5 | P@10 | P@20 | Time (s) | Space (G) |
| --- | --- | --- | --- | --- | --- | --- | --- |
| EXPANDER-S (k = 5) | N/A | 0.2071 | 0.4209 | N/A | N/A | 78.2 | 0.62 |
| EXPANDER-S (k = 10) | N/A | 0.2046 | 0.4493 | 0.5923 | N/A | 94.0 | 0.76 |
| EXPANDER-S (k = 20) | N/A | 0.2055 | 0.4646 | 0.5981 | 0.7221 | 123.1 | 0.82 |

Table 5 is similar to table 4, except the source data set is the Freebase-Relationship Subset. Table 5 does not include MAD-Sketch (w=109, d=3) row because it runs out of memory running on a single machine.

TABLE 5

|  | MMR | P@1 | P@5 | P@10 | P@20 | Time (s) | Space (G) |
| --- | --- | --- | --- | --- | --- | --- | --- |
| MAD-Sketch (w = 20, d = 3) | 0.1075 | 0.0493 | 0.2157 | 0.2252 | 0.2902 | 294 | 12 |
| EXPANDER-S (k = 5) | N/A | 0.1054 | 0.2798 | N/A | N/A | 1092 | 0.91 |
| EXPANDER-S (k = 10) | N/A | 0.1057 | 0.2818 | 0.3745 | N/A | 1302 | 1.02 |
| EXPANDER-S (k = 20) | N/A | 0.1058 | 0.2832 | 0.3765 | 0.4776 | 1518 | 1.14 |

Figure 7:
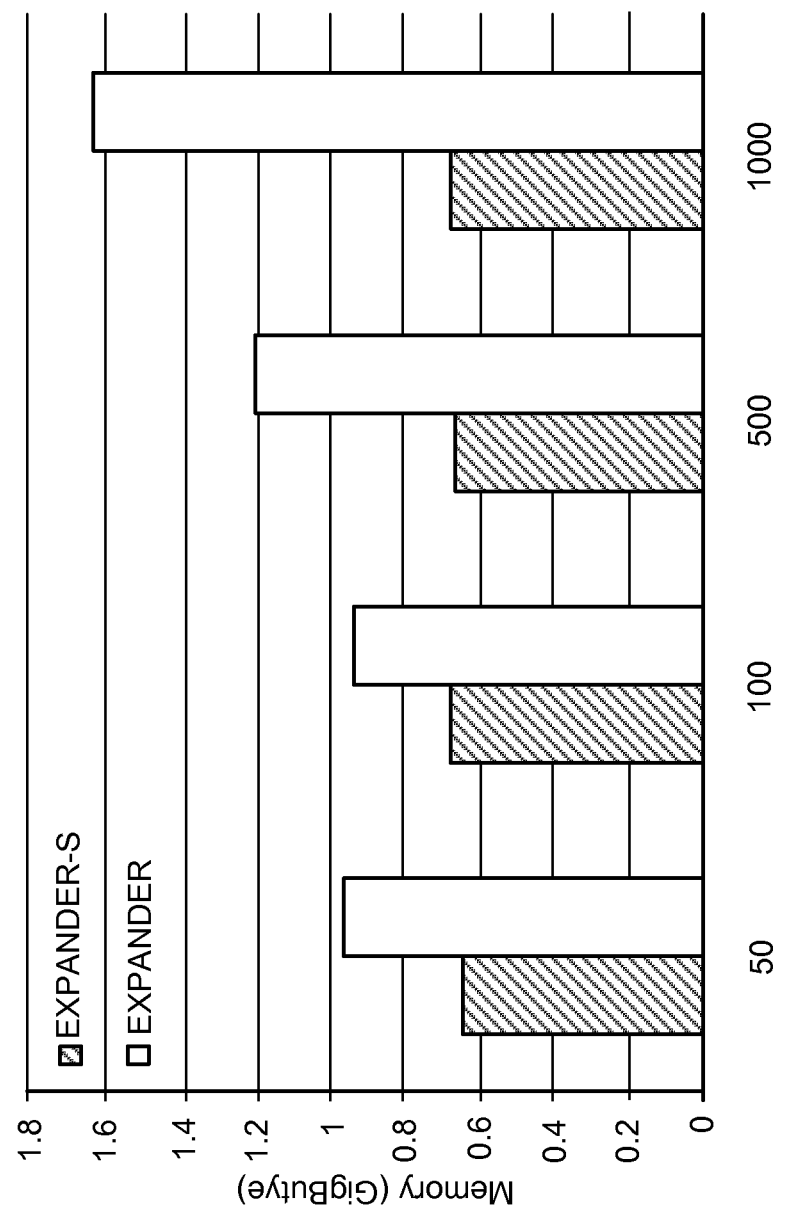
FIG. 7 illustrates memory usage enhancements that result from the sparsity approximation of various implementations.
Figure 8:
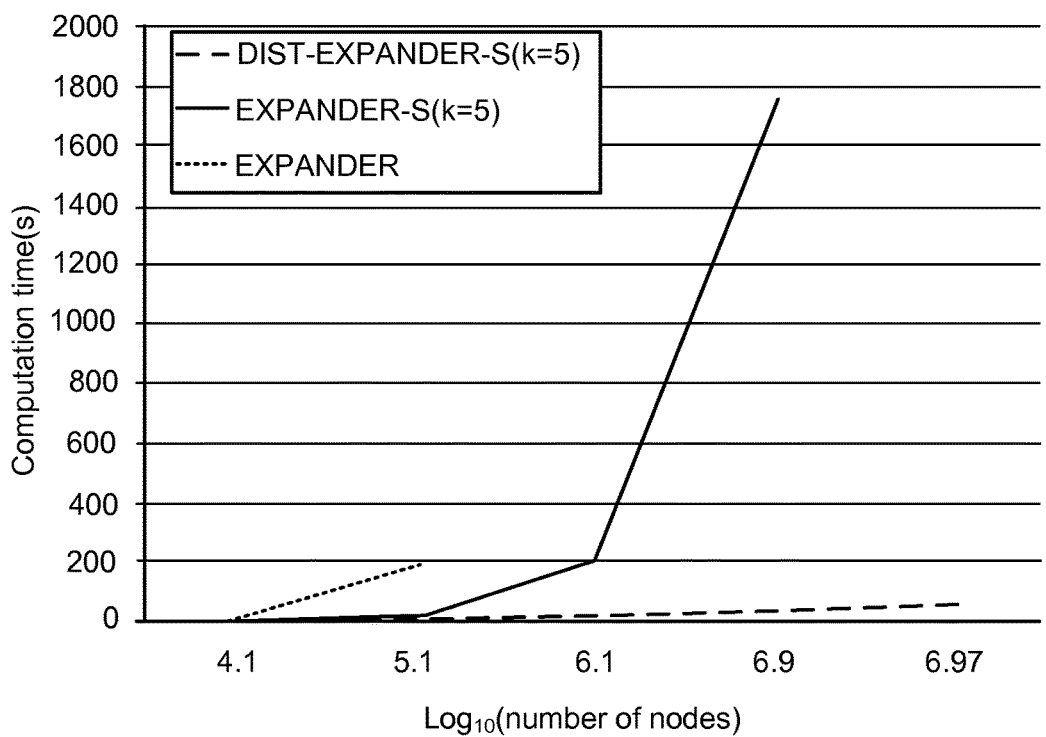
FIG. 8 demonstrates the scalability of implementations using the sparsity approximation as the input graph size increases.
Figure 8:
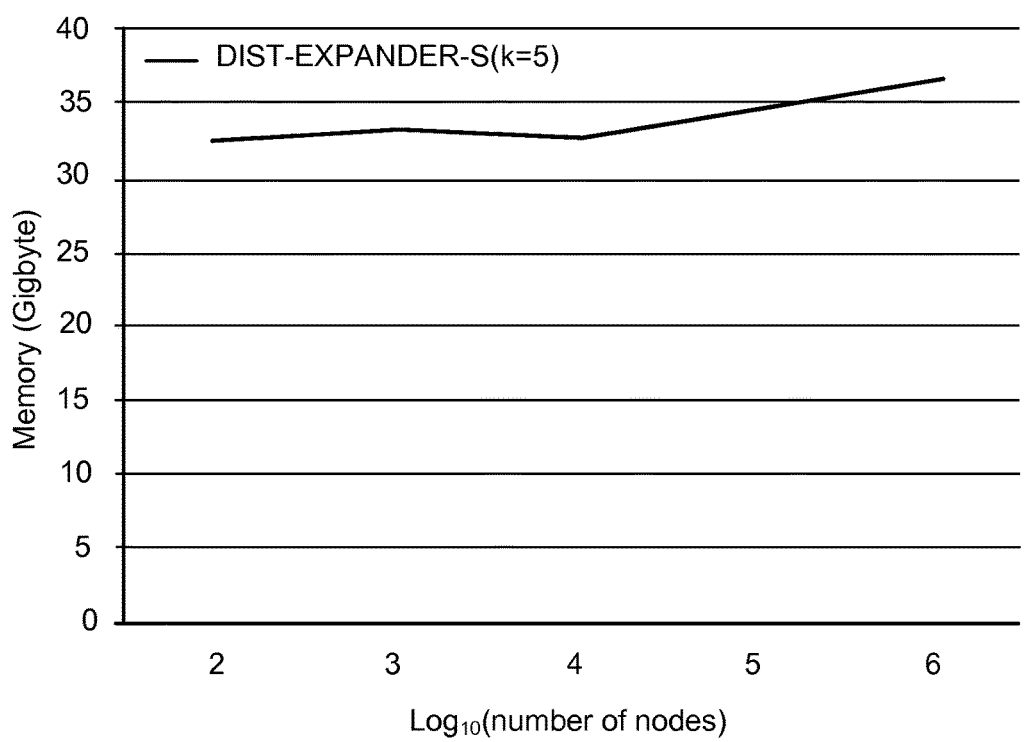

FIG. 7 illustrates memory usage enhancements that result from the sparsity approximation of various implementations. As illustrated in FIG. 7, implementations using the sparsity approximation to compactly store labels and their learned weights use almost constant memory, regardless of the number of labels in the set of labels. FIG. 8 demonstrates the scalability of implementations using the sparsity approximation as the input graph size increases. As demonstrated by the graphs of FIG. 8, when the graph is large and cannot fit on one machine, the sparsity approximation still uses consistent memory and completes in a relatively short amount of time. As tables 2-5 and FIGS. 7 and 8 demonstrate, implementations provide high-quality results using less memory than other semi-supervised learning methods.

Figure 9:
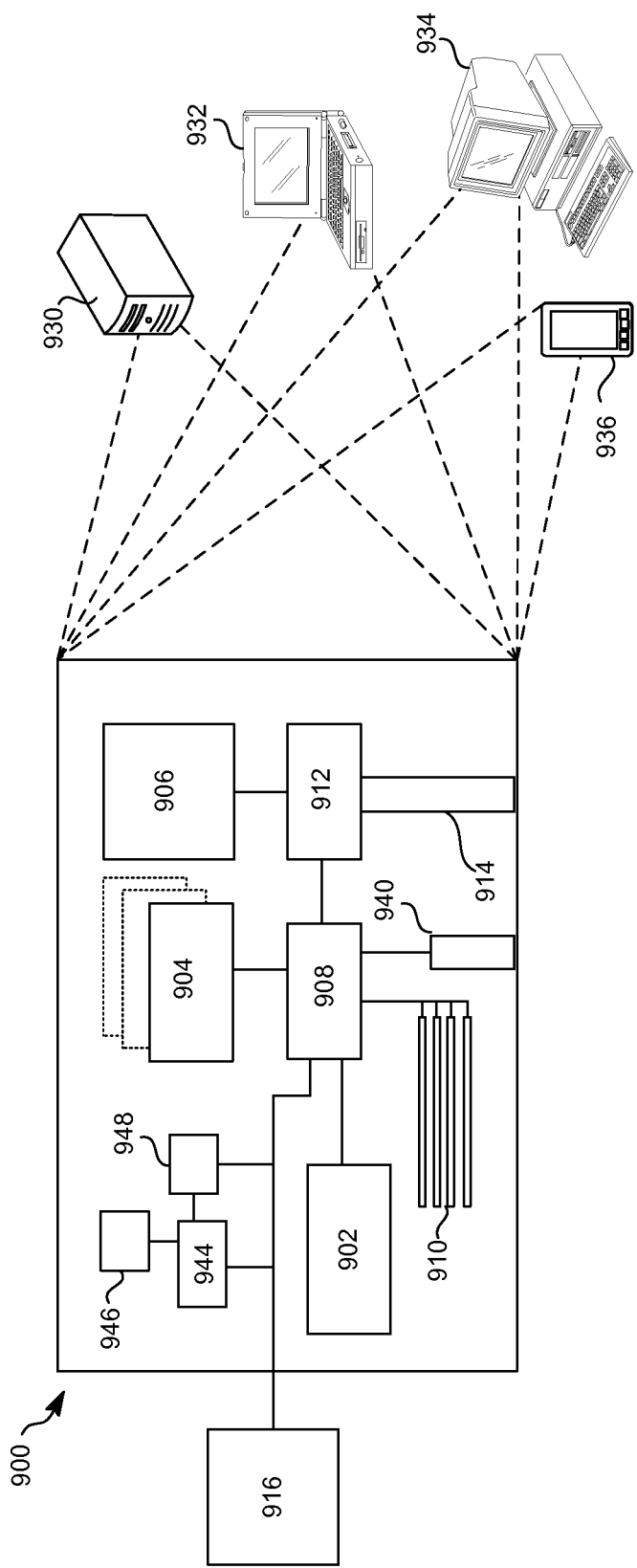
FIG. 9 shows an example of a computer device that can be used to implement the described techniques.

FIG. 9 shows an example of a generic computer device 900, which may be system 100 or client 170 of FIG. 1, which may be used with the techniques described here. Computing device 900 is intended to represent various example forms of computing devices, such as laptops, desktops, workstations, personal digital assistants, cellular telephones, smart phones, tablets, servers, and other computing devices, including wearable devices The components shown here, their connections and relationships, and their functions, are meant to be exemplary only, and are not meant to limit implementations of the inventions described and/or claimed in this document.

Computing device 900 includes a hardware (e.g., silicone-based) processor 902, memory 904, a storage device 906, and expansion ports 910 connected via an interface 908. In some implementations, computing device 900 may include transceiver 946, communication interface 944, and a GPS (Global Positioning System) receiver module 948, among other components, connected via interface 908. Device 900 may communicate wirelessly through communication interface 944, which may include digital signal processing circuitry where necessary. Each of the components 902, 904, 906, 908, 910, 940, 944, 946, and 948 may be mounted on a common motherboard or in other manners as appropriate.

The processor 902 can process instructions for execution within the computing device 900, including instructions stored in the memory 904 or on the storage device 906 to display graphical information for a GUI on an external input/output device, such as display 916. Display 916 may be a monitor or a flat touchscreen display. In some implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk. In some implementations, the memory 904 may include expansion memory provided through an expansion interface.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also contain instructions that, when executed, perform one or more methods, such as those described above. The computer- or machine-readable medium is a storage device such as the memory 904, the storage device 906, or memory on processor 902.

The interface 908 may be a high speed controller that manages bandwidth-intensive operations for the computing device 900 or a low speed controller that manages lower bandwidth-intensive operations, or a combination of such controllers. An external interface 940 may be provided so as to enable near area communication of device 900 with other devices. In some implementations, controller 908 may be coupled to storage device 906 and expansion port 914. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 930, or multiple times in a group of such servers. It may also be implemented as part of a rack server system. In addition, it may be implemented in a personal computer such as a laptop computer 922, or smart phone 936. An entire system may be made up of multiple computing devices 900 communicating with each other. Other configurations are possible.

FIG. 10 shows an example of a generic computer device 1000, which may be system 100 of FIG. 1, which may be used with the techniques described here. Computing device 1000 is intended to represent various example forms of large-scale data processing devices, such as servers, blade servers, datacenters, mainframes, and other large-scale computing devices. Computing device 1000 may be a distributed system having multiple processors, possibly including network attached storage nodes, that are interconnected by one or more communication networks. The components shown here, their connections and relationships, and their functions, are meant to be exemplary only, and are not meant to limit implementations of the inventions described and/or claimed in this document.

Distributed computing system 1000 may include any number of computing devices 1080. Computing devices 1080 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 1080a includes multiple racks 1058a-1058n. Each rack may include one or more processors, such as processors 1052a-1052n and 1062a-1062n. The processors may include data processors, network attached storage devices, and other computer controlled devices. In some implementations, one processor may operate as a master processor and control the scheduling and data distribution tasks. Processors may be interconnected through one or more rack switches 1058, and one or more racks may be connected through switch 1078. Switch 1078 may handle communications between multiple connected computing devices 1000.

Each rack may include memory, such as memory 1054 and memory 1064, and storage, such as 1056 and 1066. Storage 1056 and 1066 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 1056 or 1066 may be shared between multiple processors, multiple racks, or multiple computing devices and may include a computer-readable medium storing instructions executable by one or more of the processors. Memory 1054 and 1064 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 1054 may also be shared between processors 1052a-1052n. Data structures, such as an index, may be stored, for example, across storage 1056 and memory 1054. Computing device 1000 may include other components not shown, such as controllers, buses, input/output devices, communications modules, etc.

An entire system, such as system 100, may be made up of multiple computing devices 1000 communicating with each other. For example, device 1080a may communicate with devices 1080b, 1080c, and 1080d, and these may collectively be known as system 100. As another example, system 100 of FIG. 1 may include one or more computing devices 1000 as graph system 100, a separate computing device 1000 as root 120, and one or more computing devices 1000 as graph cluster 160. Furthermore, some of the computing devices may be located geographically close to each other, and others may be located geographically distant. The layout of system 1000 is an example only and the system may take on other layouts or configurations.

According to certain aspects of the disclosure, a method includes initializing, for nodes in a distributed graph comprising labeled nodes and unlabeled nodes, wherein an edge between two nodes in the distributed graph represents a similarity measure between the two nodes, learned label weights for at least a non-zero quantity k of labels per node. The method also includes, for a first node in the distributed graph, sending the learned label weights for the node to each neighbor in the distributed graph, receiving a set of at least k learned label weights from each neighbor, determining top-ranked labels for the first node based on a probability-based sparsity approximation using the received sets of learned label weights, and calculating learned label weights for top-ranked labels of the first node based on an aggregation of the received sets of learned label weights from the neighbors. The method also includes repeating the sending, receiving, determining, and calculating for a quantity of iterations, determining, from the learned label weights for the first node, a first label with a weight that meets or exceeds a threshold, and automatically updating a source data set with the first label, responsive to the determining.

These and other aspects can include one or more of the following features. For example, the nodes in the distributed graph may represent textual information and the method may also include, prior to initializing the learned label weights, adding additional edges between nodes in the distributed graph based on deep learning of a large corpus of text. In some implementations, adding the additional edges can include learning a semantic embedding for each node in the distributed graph using the deep learning, generating a signature for each node by applying locality sensitive hashing on the semantic embedding for the node, using the signature of a third node and the signature of a second node to determine a similarity metric between the third node and the second node, and adding an edge between the third node and the second node when the similarity metric meets a second threshold.

As another example, determining the top-ranked labels for the first node can include, for each of the labels in the sets of labels from the neighbors, determining a probability for the label based on a weighted frequency with which the label is encountered and determining a maximum error of the weighted frequency for the label, wherein the sum of the probability and the maximum error is used to determine the top-ranked labels. In some implementations, determining the probability and the maximum error includes, as the set of learned label weights for a $t^{th}$ neighbor $u_t$ are received: determining whether a probability-estimation entry exists for a label l for the first node, the probability-estimation entry including a label identifier for the label l, a frequency component, and an error component; when the probability-estimation entry exists, adding the product of the learned label weight for the label l and a similarity measure between the neighbor $u_t$ and the first node to the frequency component; and when the probability-estimation entry does not exist, creating a new probability-estimation entry for the label l, and repeating the determining, adding and creating for each label l with a learned label weight for the neighbor $u_t$. Creating the new probability-estimation entry for the label l may include setting the frequency component of the new probability-estimation entry to the product of the learned label weight for label l and a similarity measure between the neighbor $u_t$ and the first node, and setting the error component of the new probability-estimation entry to a probability threshold. In some implementations, the probability threshold may be a dynamic threshold calculated by adding the product, calculated for each previously received neighbor u, of a similarity measure between the previously received neighbor u and first node and an average probability mass for neighbor u. In some such implementations, the method may also include discarding probability-estimation entries for labels where the sum of the frequency component and the error component is less than the sum of, for each of the t neighbors u, the similarity measure between the first node and the neighbor u and the average probability mass for neighbor u.

As another example, calculating the learned weights of top-ranked labels for the first node includes, for a label l of the top-ranked labels, determining a seed component for the label l that maintains an original weight for labels of labeled nodes, for each neighbor, determining a neighbor component for the label l, the neighbor component being based on similarity of the neighbor to the first node and similarity of the k labels for the neighbor to the label l, calculating a total neighbor component for the label l by adding the neighbor components and multiplying the sum by a component weight, calculating a uniform distribution component for the label l, and setting the learned label weight for the label l to a sum of the seed component, the total neighbor component, and the uniform distribution component, the sum being divided by a normalization component for the first node and the label l.

As another example, aggregating the received sets of learned label weights from neighbors of the first node includes, for each neighbor u: determining a product by multiplying a sum of learned label weights for neighbor u by a similarity measure between the first node and the neighbor u, adding the products together, and normalizing the added products. In some implementations, the similarity measure is multiplied by an entropy parameter for the neighbor u, the entropy parameter being based on an entropy of label distribution in neighbor u. As another example, the source data set may include entities and attributes, a node in the distributed graph may represent an entity in the source data set, a label for the node may represent an attribute of the entity in the source data set, and updating the source data set includes adding, in the source data set, the attribute represented by the first label to the entity represented by the first node.

According to an aspect of the disclosure, a system includes a plurality of computing devices including processors formed in a substrate and memory storing: an input graph of nodes connected by edges, an edge representing a similarity measure between two nodes, the graph being distributed across the plurality of computing devices, wherein at least some of the nodes are seed nodes associated with one or more training labels from a set of labels, each training label having an associated original weight, the input graph being generated based on a source data set. The memory may also store instructions that, when executed by the processors, cause the plurality of distributed computing devices to perform operations. The operations may include propagating the training labels through the input graph using a sparsity approximation for label propagation, resulting in learned weights for respective node and label pairs, and automatically updating the source data set using node and label pairs selected based on the learned weights.

These and other aspects can include one or more of the following features. For example, the source data set may be a knowledge base and a node in the input graph may represent a pair of entities in the knowledge base and a label for the node may represent a relationship between the pair of entities in the knowledge base. As another example, the source data set may be a graph-based data store, a node in the graph represents an entity in the graph-based data store, a label for the node represents an attribute of the entity in the graph-based data store, and updating the source data set includes, for a first node-first label pair, associating, in the graph-based data store, an attribute corresponding to the first label with an entity corresponding to the first node.

As another example, propagating the labels can occur in a quantity of iterations that update learned label weights for respective nodes. In some implementations, propagating the labels uses a learned label structure for a first node of the input graph, the learned label structure including, for a non-zero quantity k of the labels in the input graph: a label identifier and a learned label weight, where k is less than a total quantity of unique labels in the input graph. In some implementations, updating the learned label weights for a first node in a first iteration includes receiving learned label weights for k labels from neighbor nodes, where k is a non-zero integer, ranking labels for the first node based on the received learned label weights to identify top-ranked labels, and for k of the top-ranked labels for the first node, calculating a label weight for the label using a similarity measure between the first node and the neighbor u. In some implementations, calculating the label weight for the label also uses a similarity measure between each label l' that has a learned label weight for the neighbor u and label l and the learned label weight of label l' for neighbor u. In some implementations, the similarity between label l and label l' is taken from a similarity matrix generated from random walks from the seed nodes in the graph. In some implementations, calculating the label weight for the label also uses a similarity measure between each label l' that has a learned label weight for the neighbor u and label l and the learned label weight of label l' for neighbor u and an entropy parameter for neighbor u based on a label distribution for neighbor u. In some implementations, calculating the label weight for the label also uses a uniform distribution of label l, a normalization constant for the first node and label l, and similarity measure between each label l' that has a learned label weight for the neighbor u and label l and the learned label weight of label l' for neighbor u.

According to one aspect of the disclosure, a method includes initializing, for nodes in an input graph comprising labeled nodes and unlabeled nodes, learned label weights for a non-zero quantity q of labels per node, wherein an edge between two nodes in the input graph represents a similarity measure between the two nodes and adding additional edges between nodes in the input graph based on deep learning of a large corpus of text. The method may also include, for a first node in the input graph, sending the learned label weights for the first node to each neighbor in the input graph, receiving a set of q learned labels and respective learned label weights from each neighbor, updating the learned weights of labels for the first node based on an aggregation of the received learned label weights from the neighbors, and repeating the sending, receiving, and updating for a quantity of iterations. The method may further include determining, from the updated learned label weights for the first node, a first label with a learned label weight that meets or exceeds a threshold, and automatically updating a source data set with the first label, responsive to the determining.

These and other aspects can include one or more of the following features. For example, q may be a quantity smaller than the unique set of labels in the input graph and the method may also include determining top-ranked labels for the first node based on a probability-based sparsity approximation using the received learned label weights, wherein updating the learned weights includes updating q of the top ranked labels for the first node. In some implementations, adding the additional edges cab include learning a semantic embedding for each node in the input graph using the deep learning, generating a signature for each node by applying locality sensitive hashing on the semantic embedding for the node, using the signature of a third node and the signature of a second node to determine a similarity metric between the third node and the second node, and adding an edge between the third node and the second node when the similarity metric meets a second threshold. As another example, aggregating the received learned label weights includes using an entropy parameter for each neighbor u to minimize the contribution of neighbors with high label distribution entropy.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor but not to transitory signals.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
    initializing, for nodes in a distributed graph comprising labeled nodes and unlabeled nodes, wherein an edge between two nodes in the distributed graph represents a similarity measure between the two nodes, learned label weights for at least a non-zero quantity k of labels per node;
    for a first node in the distributed graph:
        sending the learned label weights for the node to each neighbor in the distributed graph,
        receiving a set of at least k learned label weights from each neighbor,
        determining top-ranked labels for the first node based on a probability-based sparsity approximation using the received sets of learned label weights, and
        calculating learned label weights for top-ranked labels of the first node based on an aggregation of the received sets of learned label weights from the neighbors;
    repeating the sending, receiving, determining, and calculating for a quantity of iterations;
    determining, from the learned label weights for the first node, a first label with a weight that meets or exceeds a threshold; and
    automatically updating a source data set with the first label, responsive to the determining.

2. The method of claim 1, wherein the nodes in the distributed graph represent textual information and the method further comprises, prior to initializing the learned label weights, adding additional edges between nodes in the distributed graph based on deep learning of a large corpus of text.

3. The method of claim 2, wherein adding the additional edges includes:
    learning a semantic embedding for each node in the distributed graph using the deep learning;
    generating a signature for each node by applying locality sensitive hashing on the semantic embedding for the node;
    using the signature of a third node and the signature of a second node to determine a similarity metric between the third node and the second node; and
    adding an edge between the third node and the second node when the similarity metric meets a second threshold.

4. The method of claim 1, wherein determining the top-ranked labels for the first node includes, for each of the labels in the sets of labels from the neighbors:
    determining a probability for the label based on a weighted frequency with which the label is encountered; and determining a maximum error of the weighted frequency for the label,
wherein the sum of the probability and the maximum error is used to determine the top-ranked labels.

5. The method of claim 4, wherein determining the probability and the maximum error includes, as the set of learned label weights for a $t^{th}$ neighbor $u_t$ are received:
determining whether a probability-estimation entry exists for a label l for the first node, the probability-estimation entry including a label identifier for the label l, a frequency component, and an error component;
when the probability-estimation entry exists, adding the product of the learned label weight for the label l and a similarity measure between the neighbor $u_t$ and the first node to the frequency component;
when the probability-estimation entry does not exist, creating a new probability-estimation entry for the label by:
setting the frequency component of the new probability-estimation entry to the product of the learned label weight for label l and a similarity measure between the neighbor $u_t$ and the first node, and
setting the error component of the new probability-estimation entry to a probability threshold; and
repeating the determining, adding and creating for each label l with a learned label weight for the neighbor $u_t$.

6. The method of claim 5, wherein the probability threshold is a dynamic threshold calculated by adding the product, calculated for each previously received neighbor u, of a similarity measure between the previously received neighbor u and the first node and an average probability mass for neighbor u.

7. The method of claim 6, further comprising:
discarding probability-estimation entries for labels where the sum of the frequency component and the error component is less than the sum of, for each of the t neighbors u, the similarity measure between the first node and the neighbor u and the average probability mass for neighbor u.

8. The method of claim 1, wherein calculating the learned weights of top-ranked labels for the first node includes, for a label l of the top-ranked labels:
determining a seed component for the label l that maintains an original weight for labels of labeled nodes;
for each neighbor, determining a neighbor component for the label l, the neighbor component being based on similarity of the neighbor to the first node and similarity of the k labels for the neighbor to the label l;
calculating a total neighbor component for the label l by adding the neighbor components and multiplying the sum by a component weight;
calculating a uniform distribution component for the label l; and
setting the learned label weight for the label l to a sum of the seed component, the total neighbor component, and the uniform distribution component, the sum being divided by a normalization component for the first node and the label l.

9. The method of claim 1, wherein aggregating the received sets of learned label weights from neighbors of the first node includes, for each neighbor u:
determining a product by multiplying a sum of learned label weights for neighbor u by a similarity measure between the first node and the neighbor u;
adding the products together; and
normalizing the added products.

10. The method of claim 9, wherein the similarity measure is multiplied by an entropy parameter for the neighbor u, the entropy parameter being based on an entropy of label distribution in neighbor u.

11. The method of claim 1, wherein the source data set includes entities and attributes, a node in the distributed graph represents an entity in the source data set, a label for the node represents an attribute of the entity in the source data set, and updating the source data set includes adding, in the source data set, the attribute represented by the first label to the entity represented by the first node.

12. A system comprising:
a plurality of computing devices including processors formed in a substrate and memory storing:
an input graph of nodes connected by edges, an edge representing a similarity measure between two nodes, the graph being distributed across the plurality of computing devices, wherein at least some of the nodes are seed nodes associated with one or more training labels from a set of labels, each training label having an associated original weight, the input graph being generated based on a source data set; and
instructions that, when executed by the processors, cause the plurality of distributed computing devices to perform operations comprising:
propagating the training labels through the input graph using a sparsity approximation for label propagation, resulting in learned weights for respective node and label pairs, and
automatically updating the source data set using node and label pairs selected based on the learned weights.

13. The system of claim 12, wherein the source data set is a knowledge base and a node in the input graph represents a pair of entities in the knowledge base and a label for the node represents a relationship between the pair of entities in the knowledge base.

14. The system of claim 12, wherein the source data set is a graph-based data store, a node in the graph represents an entity in the graph-based data store, a label for the node represents an attribute of the entity in the graph-based data store, and updating the source data set includes, for a first node-first label pair, associating, in the graph-based data store, an attribute corresponding to the first label with an entity corresponding to the first node.

15. The system of claim 12, wherein propagating the labels occurs in a quantity of iterations that update learned label weights for respective nodes.

16. The system of claim 15, wherein propagating the labels uses a learned label structure for a first node of the input graph, the learned label structure including, for a non-zero quantity k of labels in the input graph:
a label identifier; and
a learned label weight,
where k is less than a total quantity of unique labels in the input graph.

17. The system of claim 15, wherein updating the learned label weights for a first node in a first iteration includes:
receiving learned label weights for k labels from neighbor nodes, where k is a non-zero integer;
ranking labels for the first node based on the received learned label weights to identify top-ranked labels; and
for k of the top-ranked labels for the first node, calculating a label weight for the label using a similarity measure between the first node and the neighbor u.

18. The system of claim 17, wherein calculating the label weight for the label also uses a similarity measure between each label l' that has a learned label weight for the neighbor u and label l and the learned label weight of label l' for neighbor u.

19. The system of claim 18, wherein the similarity between label l and label l' is taken from a similarity matrix generated from random walks from the seed nodes in the graph.

20. The system of claim 17, wherein calculating the label weight for the label also uses a similarity measure between each label l' that has a learned label weight for the neighbor u and label l and the learned label weight of label l' for neighbor u and an entropy parameter for neighbor u based on a label distribution for neighbor u.

21. The system of claim 17, wherein calculating the label weight for the label also uses a uniform distribution of label l, a normalization constant for the first node and label l, and similarity measure between each label l' that has a learned label weight for the neighbor u and label l and the learned label weight of label l' for neighbor u.

22. A method comprising:
   initializing, for nodes in an input graph comprising labeled nodes and unlabeled nodes, learned label weights for a non-zero quantity q of labels per node, wherein an edge between two nodes in the input graph represents a similarity measure between the two nodes;
   adding additional edges between nodes in the input graph based on deep learning of a large corpus of text;
   for a first node in the input graph:
      sending the learned label weights for the first node to each neighbor in the input graph,
      receiving a set of q learned labels and respective learned label weights from each neighbor, and
      updating the learned weights of labels for the first node based on an aggregation of the received learned label weights from the neighbors;
   repeating the sending, receiving, and updating for a quantity of iterations;
   determining, from the updated learned label weights for the first node, a first label with a learned label weight that meets or exceeds a threshold; and
   automatically updating a source data set with the first label, responsive to the determining.

23. The method of claim 22, wherein q is a quantity smaller than the set of labels in the input graph, and the method further comprises:
   determining top-ranked labels for the first node based on a probability-based sparsity approximation using the received learned label weights,
   wherein updating the learned weights includes updating q of the top ranked labels for the first node.

24. The method of claim 23, wherein adding the additional edges includes:
   learning a semantic embedding for each node in the input graph using the deep learning;
   generating a signature for each node by applying locality sensitive hashing on the semantic embedding for the node;
   using the signature of a third node and the signature of a second node to determine a similarity metric between the third node and the second node; and
   adding an edge between the third node and the second node when the similarity metric meets a second threshold.

25. The method of claim 22, wherein aggregating the received learned label weights includes using an entropy parameter for each neighbor u to minimize the contribution of neighbors with high label distribution entropy.

* * * * *